US012793093B2

(12) United States Patent
Smith et al.

(10) Patent No.: US 12,793,093 B2
(45) Date of Patent: Nov. 10, 2026

(54) PRODUCT EVALUATION SYSTEM AND METHOD OF USE

(71) Applicant: Pattern Inc., Lehi, UT (US)

(72) Inventors: Matthew Scott Smith, Lehi, UT (US); Jason Andrew Wells, Lehi, UT (US); Jacob Nephi Miller, Cedar City, UT (US); Joseph Oliver White, Eagle Mountain, UT (US)

(73) Assignee: Pattern Inc., Lehi, UT (US)

( * ) Notice: Subject to any disclaimer, the term of this patent is extended or adjusted under 35 U.S.C. 154(b) by 0 days.

(21) Appl. No.: 17/730,869

(22) Filed: Apr. 27, 2022

(65) Prior Publication Data

US 2022/0253874 A1 Aug. 11, 2022

Related U.S. Application Data

(63) Continuation of application No. 17/094,637, filed on Nov. 10, 2020, now Pat. No. 11,321,724.

(Continued)

(51) Int. Cl.
*G06Q 30/0202* (2023.01)
*G06F 16/953* (2019.01)

(Continued)

(52) U.S. Cl.
CPC ....... *G06Q 30/0202* (2013.01); *G06F 16/953* (2019.01); *G06F 40/205* (2020.01);

(Continued)

(58) Field of Classification Search
CPC ........... G06Q 30/0202; G06Q 30/0282; G06Q 30/0631
See application file for complete search history.

(56) References Cited

U.S. PATENT DOCUMENTS 7,783,528 B2 * 8/2010 Musgrove ............... G10L 21/00 705/26.1
8,019,656 B2 * 9/2011 Baran ................ G06Q 30/0629 705/26.7

(Continued)

OTHER PUBLICATIONS

Paul E. Green et al, Segmenting Markets With Conjoint Analysis, Journal of Marketing vol. 55 (Oct. 1991), 20-31 (Year: 1991).*

(Continued)

*Primary Examiner* — Andre D Boyce
(74) *Attorney, Agent, or Firm* — Dickinson Wright PLLC

(57) ABSTRACT

A method of evaluating a product, the method may include with an assessment module executed by a processor assessing attributes of a target product and listing relevant descriptive terms of the target product descriptive of the attributes of the target product; with a network interface device, accessing a computer-networked marketplace and identifying at least one organic competing product matching at least one descriptive term; with a comparison module executed by the processor: comparing the descriptive terms of the target product to descriptive terms associated with the at least one organic competing product to generate a competitivity score; and with a recommendation module executed by the processor: generating an actionable report descriptive of a projected performance of the target product in the computer-networked marketplace relative to the at least one organic competing product.

18 Claims, 10 Drawing Sheets

Related U.S. Application Data

(60) Provisional application No. 63/092,043, filed on Oct. 15, 2020.

(51) Int. Cl.

| | |
|---|---|
| ***G06F 40/205*** | (2020.01) |
| ***G06N 20/00*** | (2019.01) |
| ***G06Q 10/10*** | (2023.01) |
| ***G06Q 30/0282*** | (2023.01) |
| ***G06Q 30/0601*** | (2023.01) |

(52) U.S. Cl.

CPC ............. *G06N 20/00* (2019.01); *G06Q 10/10* (2013.01); *G06Q 30/0282* (2013.01); *G06Q 30/0629* (2013.01); *G06Q 30/0631* (2013.01)

(56) References Cited

U.S. PATENT DOCUMENTS

| | | | | |
|---|---|---|---|---|
| 8,036,929 | B1 * | 10/2011 | Reisman | G06Q 30/0203 705/7.29 |
| 10,423,999 | B1 * | 9/2019 | Doctor | G06Q 30/0631 |
| 10,909,614 | B2 * | 2/2021 | Szulczewski | G06Q 30/0201 |
| 2003/0204447 | A1 * | 10/2003 | Dalzell | G06Q 30/02 235/375 |
| 2003/0204449 | A1 * | 10/2003 | Kotas | G06Q 30/02 707/781 |
| 2004/0230469 | A1 * | 11/2004 | Christopherson | G06Q 30/02 705/7.29 |
| 2008/0077471 | A1 * | 3/2008 | Musgrove | G06Q 30/02 705/7.29 |
| 2008/0215349 | A1 * | 9/2008 | Baran | G06Q 10/10 705/1.1 |
| 2009/0192808 | A1 * | 7/2009 | Sela | G06Q 30/0603 705/1.1 |
| 2010/0217650 | A1 * | 8/2010 | Hartnell | G06Q 30/0201 705/7.29 |
| 2011/0251973 | A1 * | 10/2011 | Chen | G06Q 30/0282 705/347 |
| 2014/0188838 | A1 * | 7/2014 | Strugov | G06Q 30/0282 707/710 |
| 2015/0199770 | A1 * | 7/2015 | Wallenstein | G06Q 30/0605 705/26.2 |
| 2015/0324884 | A1 * | 11/2015 | Ouimet | G06Q 30/0617 705/14.27 |
| 2016/0217522 | A1 * | 7/2016 | Jnagal | G06F 16/95 |
| 2016/0239890 | A1 * | 8/2016 | Sesha | G06Q 50/12 |
| 2016/0267377 | A1 * | 9/2016 | Pan | G06Q 30/0201 |
| 2017/0109400 | A1 * | 4/2017 | Moore | G06F 16/26 |
| 2017/0124576 | A1 * | 5/2017 | Lagoni | H04L 67/02 |
| 2019/0095973 | A1 * | 3/2019 | Byron | G06Q 30/0282 |
| 2019/0213660 | A1 * | 7/2019 | Astrada | G06Q 40/02 |
| 2019/0244229 | A1 * | 8/2019 | Szulczewski | G06Q 30/0631 |
| 2019/0317842 | A1 * | 10/2019 | Bharti | G06F 16/285 |
| 2020/0401976 | A1 * | 12/2020 | Nelson | G06Q 10/087 |

OTHER PUBLICATIONS

Akshay R. Rao et al, The Moderating Effect of Prior Knowledge on Cue Utilization in Product Evaluations, Journal of Consumer Research, Sep., 1988, vol. 15, No. 2 (Sep. 1988), pp. 253-264 (Year: 1988).*

* cited by examiner

PRODUCT EVALUATION SYSTEM AND METHOD OF USE

CROSS-REFERENCE TO RELATED APPLICATIONS

The present application is a continuation of U.S. patent application Ser. No. 17/094,637 filed on Nov. 10, 2020, now U.S. Pat. No. 11,321,724 issued on May 3, 2022, which claims the benefit of U.S. Provisional Application No. 63/092,043 filed on Oct. 15, 2020, entitled "Product Evaluation System and Method of Use, which are incorporated herein by reference in their entirety.

TECHNICAL FIELD

The present invention relates generally to commerce systems and methods, and more specifically, to a product evaluation system that collects and extrapolates data about a product to produce a measurement of its viability and competitiveness in a market.

BACKGROUND

Commerce systems are well known in the art and are effective means to allow for the transaction of products, commodities, services and the like from one party to another. Commonly, commerce systems are embodied by a market, where many products are offered for sale and people that are customers are able to shop or browse the products and select items for purchase. Such markets may be managed by companies that include Ebay®, Amazon®, Wayfair®, Costco®, Walmart®, and Target®, among others. With the advent of digital marketplaces, sellers are allowed to list products for purchase to anyone with an internet connection. Commonly, many sellers will offer the same or similar products. Shoppers (e.g., users accessing digital marketplaces via the internet) are able to sort through and browse all of these products to find what they are looking for.

One of the problems commonly associated with common commerce systems and digital marketplaces is their density of potential products that may be sold. For example, when a shopper wants to purchase a product, the shopper may start with a search at a search engine that provides hundreds or thousands of products. Unlike "brick and mortar" marketplaces (e.g., physical markets), digital marketplaces search at least one designated digital marketplace and potentially multiple digital marketplaces that may provide thousands of results. Any specific product may be lost within the copious amounts of results provided from the search. This may make it difficult for a seller of a product to get that product noticed and purchased.

Still further, a seller may have recently created a product or has recently placed that product on the digital marketplace but may not know to what extent the seller should focus on promotion of that product. In this example, a seller may not know what appropriate target advertising cost of sale (ACoS) to meet or exceed in order to see long term gains in lieu of short-term profits. When the density of the products within the marketplace is high, spending more money to meet and exceed this ACoS allows for more recognition in these digital marketplaces allowing for more potential sales.

Accordingly, although great strides have been made in the area of commerce systems and digital marketplaces, these many shortcomings remain.

SUMMARY OF THE INVENTION

The various systems and methods of the present invention have been developed in response to the present state of the art, and in particular, in response to the problems and needs in the art that have not yet been fully solved by currently available digital marketplaces. The systems and methods of the present invention may provide evaluation processes of a target product placed on a digital marketplace to determine the competitiveness of the target product.

In some embodiments, the method may be executed by assessing attributes of a target product and listing relevant descriptive terms of the target product descriptive of the attributes of the target product. This may be done, in an embodiment, via the execution of computer executable program code defining an assessment module by a processor of computing device associated with the seller. The seller may then cause the seller's computing device to, with a network interface device, access a computer-networked marketplace and identify at least one organic competing product matching at least one descriptive term. The descriptive terms associated with each of the identified organic competing products may be compared to the descriptive terms associated with the target product in order to help generate a competitivity score. The processor of the seller's computing device may then execute computer executable program code defining a recommendation module to generate an actionable report descriptive of a projected performance of the target product in the computer-networked marketplace relative to the at least one organic competing product. Again, this actionable report may include data descriptive of the product density of the target product and organic competing product so that an ACoS may be developed. Prices may also be taken into consideration and provided in the actionable report to describe better how the target product may or may not perform in the digital marketplace with and without an increase in ACoS.

The method may also include assessing specific attributes in order to list the relevant descriptive terms of the target product. These attributes may include ratings provided by at least one purchaser of the target product; reviews provided by the at least one purchaser of the target product; listed prices of the target product; content within the reviews provided by the at least one purchaser of the target product; and ranking of the target product relative to the at least one organic competing product, among attributes. The attributes are used to develop keywords used to identify at least one organic competing product presented at a digital marketplace. The development of these keywords may be done via, in a specific embodiment, executing computer executable program code defining a text analytics module to analyze the text associated with these various attributes and extract appropriate keywords therefrom. Reviews and ratings of the target product may include consumer-provided text that include keywords or descriptive terms that help the seller's computing device to compare these descriptive terms. Descriptive terms may also be generated based on the ranking of the target product, listed prices of the target product, and the number of reviews associated with the target product.

These descriptive terms associated with the target product may be compared with similar descriptive terms associated with the at least one organic competing product. Because the at least one organic competing product is also on a digital marketplace, the processor of the seller's computing device may also execute the text analytics module to generate keywords or descriptive terms associated with the at least one organic competing product in order to compare the target product to the at least one organic competing product.

With the comparison being made, a competitivity score may be calculated and provided to the processor to execute computer executable program code defining a recommendation module to develop an actionable report to the seller descriptive of whether the target product is competitive with the organic competing product.

In an embodiment, the attributes of the target product may be associated with the ratings provided by at least one purchaser of the target product; a number of reviews associated the target product; listed prices of the target product; content within the reviews provided by the at least one purchaser of the target product; and ranking of the target product relative to the at least one organic competing product. The specific attributes may be obtained by the assessment module accessing data on the computer-networked marketplace.

A text analytics module may also be executed by a processor to parse text associated with the target product to be used as the descriptive terms target product used to identify the at least one organic competing product.

Computer executable program code defining a competitive score generating module may be further executed by a processor to determine whether the competitivity score has reached a threshold and, in response to the threshold being met or exceeded, forward the competitivity score onto the processor to execute computer executable program code defining a recommendation module used to generate the actionable report. In an embodiment, the competitivity score and revenue data associated with the at least one organic competing product may be passed onto the recommendation module in order to generate the actionable report descriptive of the projected performance of the target product. Still further, in an embodiment, the competitive score generating module may determine that the competitivity score does not meet the threshold and pass a threshold failure signal onto to the recommendation module indicative of a non-competitive status of the target product.

The present specification further describes a method of providing a competitive assessment of a target product on a marketplace. This method may include, with a processor, evaluating the target product to determine attributes of the target product. The method may also include, with the processor accessing a digital marketplace to determine at least one organic competing product comparative to the target product and, upon execution of a competitivity score generator by the processor, calculating a competitivity score related to the ability of the target product to compete with the at least one organic competing product. The method may also include, upon execution of a recommendation module, generating an actionable report based on the ability of the target product to compete with the at least one organic competing product. In an embodiment, the method may further include parsing text associated with the target product to be used as the attributes of the target product used to identify the at least one organic competing product.

The method may also include determining whether the competitivity score has reached a threshold and, in response to the threshold being met or exceeded, forward the competitivity score onto the report module. In an embodiment, the method may include using the competitivity score and revenue data associated with the at least one organic competing product to generate an actionable report descriptive of a projected performance of the target product.

In an embodiment, the method may also include augmenting the actionable report with data descriptive of search terms found to be most general and similar between the target product and organic competing product and most relevant and frequent search terms similar between the target product and organic competing product. The method further includes generating a winnability report descriptive of a probability of winning a winnable search term associated with the target product and an estimated cost to win the winnable search term. In an embodiment, a machine learning module may be used to develop the augmented actionable report and winnability report.

The present specification further describes a computer program product for evaluating a product. The computer program product may include a non-transitory storage medium and computer program code, encoded on the non-transitory storage medium, wherein the computer program code is configured to cause at least one processor to perform certain steps. In an embodiment, these steps may include causing an assessment module to assess attributes of a target product and list descriptive terms for the target product descriptive of the attributes of the target product. The execution of the computer program code by the processor may cause execute, via a network interface device, the processor to access a computer-networked marketplace and identifying at least one organic competing product, compare the attributes of the target product to the attributes of the at least one organic competing product to generate a competitivity score, and determine an opportunity for the target product in the marketplace.

In an embodiment, the computer program product may further include computer program code is configured to cause at least one processor to read an identification tag associated with the target product while assessing the attributes of the target product to determine ratings provided by at least one purchaser of the target product, reviews provided by the at least one purchaser of the target product, listed prices of the target product, content within the reviews provided by the at least one purchaser of the target product, and ranking of the target product relative to the at least one organic competing product. In an embodiment, the computer program code may, upon execution of the processor, cause a description module to generate, based on the attributes of the target product, descriptive terms that include keywords contemplated to be terms that are used to search for the at least one organic competing product at a digital marketplace. In an embodiment, the computer program code may, upon execution of the processor, cause a competitive score generating module to generate a competitivity score descriptive of the competitivity of the target product relative to the least one organic competing product. In an embodiment, the computer program code may, upon execution of the processor, with a filtering module, filter the descriptive terms to relevant descriptive terms that have resulted in the purchase of the target product in the marketplace The present specification also describes a system for providing a competitive assessment of a target product on a marketplace. The system may include a processor, a data store, and a network interface device to communicatively couple the system to a network. In an embodiment, the system may also include an assessment module to evaluate the target product to determine attributes of the target product and accesses a digital marketplace to determine at least one organic competing product comparative to the target product. The system may also include a competitivity score generator configured to calculate a competitivity score related to the ability of the target product to compete with the at least one organic competing product and a recommendation module to generate a competitive report based on the ability of the target product to compete with the at least one organic competing product. In another embodiment, the system may also include a text analytics module to parse text associated with the target product to be used as the descriptive terms target product used to identify the at least one organic competing product and a filtering module to filter the descriptive terms to relevant descriptive terms that have resulted in the purchase of the target product in the marketplace.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Exemplary embodiments of the invention will be best understood by reference to the drawings, wherein like parts are designated by like numerals throughout. It will be readily understood that the components of the invention, as generally described and illustrated in the Figures herein, could be arranged and designed in a wide variety of different configurations. Thus, the following more detailed description of the embodiments of the apparatus, system, and method, as represented in FIGS. 1 through 7, is not intended to limit the scope of the invention, as claimed, but is merely representative exemplary of exemplary embodiments of the invention.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

In the present specification and in the appended claims the term "module" is meant as any computer executable program code, hardware, firmware, or a combination thereof that performs an action as instructed by a processor. In an embodiment, the modules may be completely defined by computer executable program code stored or maintained on a physical memory device within or among one or more computing devices such as a smartphone, a desktop computing device, and a laptop computing device, among others. I an embodiment, the module may be an application specific integrated circuit (ASIC) that is assessable by a processor to perform the actions and processes associated with that module.

Figure 1:
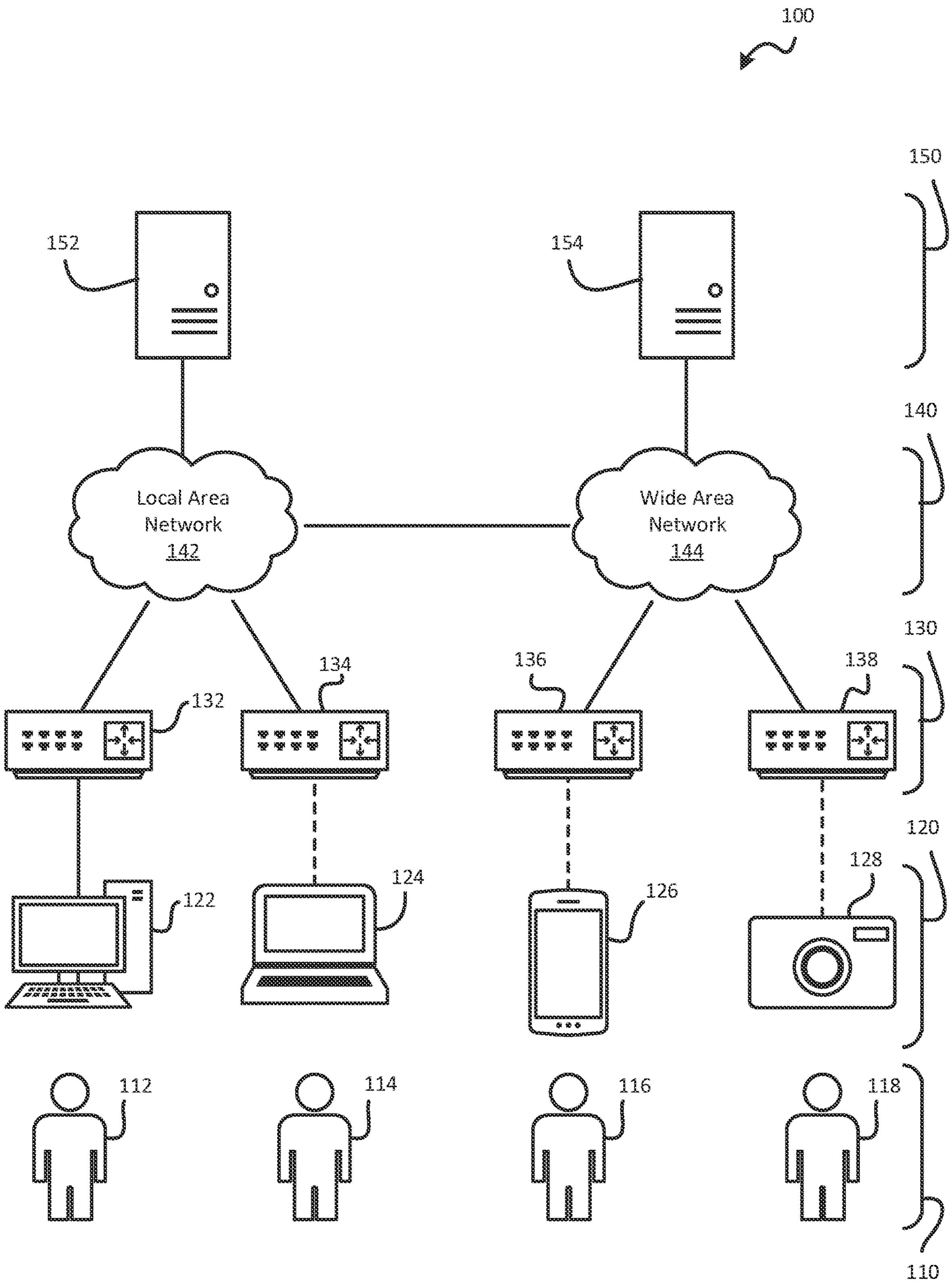
FIG. 1 is a schematic block diagram illustrating a system according to one embodiment of the invention.

Referring to FIG. 1, a schematic block diagram illustrates a system 100 according to one embodiment of the invention. The system 100 may be used for the benefit of one or more users 110, which may include a first user 112, a second user 114, a third user 116, and a fourth user 118 as shown in FIG. 1. Each of the users 110 may use one of a variety of computing devices 120, which may include any of a wide variety of devices that carry out computational steps, including but not limited to a desktop computer 122 used by the first user 112, a laptop computer 124 used by the second user 114, a smartphone 126 used by the third user 116, a camera 128 used by the fourth user 118, and the like. The system and method presented herein may be carried out on any type of computing device.

The computing devices 120 may optionally be connected to each other and/or other resources. Such connections may be wired or wireless, and may be implemented through the use of any known wired or wireless communication standard, including but not limited to Ethernet, 802.11a, 802.11b, 802.11g, and 802.11n, universal serial bus (USB), Bluetooth, cellular, near-field communications (NFC), Bluetooth Smart, ZigBee, and the like. In FIG. 1, by way of example, wired communications are shown with solid lines and wireless communications are shown with dashed lines.

Communications between the various elements of FIG. 1 may be routed and/or otherwise facilitated through the use of routers 130. The routers 130 may be of any type known in the art, and may be designed for wired and/or wireless communications through any known communications standard including but not limited to those listed herein. The routers 130 may include, for example, a first router 132 that facilitates communications to and/or from the desktop computer 122, a second router 134 that facilitates communications to and/or from the laptop computer 124, a third router 136 that facilitates communications to and/or from the smartphone 126, and a fourth router 138 that facilitates communications to and/or from the camera 128.

The routers 130 may facilitate communications between the computing devices 120 and one or more networks 140, which may include any type of networks including but not limited to local area networks such as a local area network 142, and wide area networks such as a wide area network 144. In one example, the local area network 142 may be a network that services an entity such as a business, non-profit entity, government organization, or the like. The wide area network 144 may provide communications for multiple entities and/or individuals, and in some embodiments, may be the Internet. The local area network 142 may communicate with the wide area network 144. If desired, one or more routers or other devices may be used to facilitate such communication.

The networks 140 may store information on servers 150 or other information storage devices. As shown, a first server 152 may be connected to the local area network 142, and may thus communicate with devices connected to the local area network 142 such as the desktop computer 122 and the laptop computer 124. A second server 154 may be connected to the wide area network 144, and may thus communicate with devices connected to the wide area network 144, such as the smartphone 126 and the camera 128. If desired, the second server 154 may be a web server that provides web pages, web-connected services, executable code designed to operate over the Internet, and/or other functionality that facilitates the provision of information and/or services over the wide area network 144.

Figure 2A:
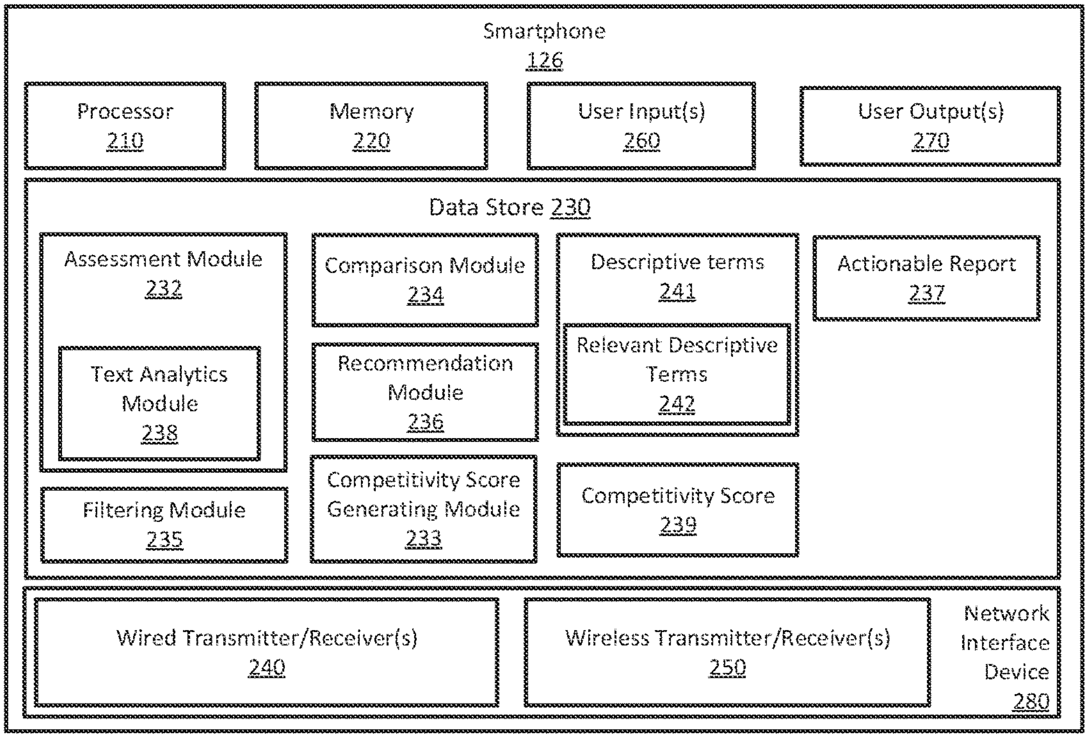
FIG. 2A is a schematic block diagram illustrating a computing device in the form of the smartphone of FIG. 1, which is capable of practicing the invention in a standalone computing environment.

Referring to FIG. 2A, a schematic block diagram illustrates an exemplary computing device of the computing devices 120 that may enable implementation of the invention in a standalone computing environment. The computing device may be, for example, the smartphone 126 of FIG. 1. The present specification, however, contemplates that the computing device 120 may include any of those computing devices 120 described in FIG. 1 or any other type of computing device.

As shown, the smartphone 126 may include a processor 210 that is designed to execute instructions on data. The processor 210 may be of any of a wide variety of types, including microprocessors with x86-based architecture or other architecture known in the art, application-specific integrated circuits (ASICs), field-programmable gate arrays (FPGA's), and the like. The processor 210 may optionally include multiple processing elements, or "cores." The processor 210 may include a cache that provides temporary storage of data incident to the operation of the processor 210.

The smartphone 126 may further include memory 220, which may be volatile memory such as random-access memory (RAM). The memory 220 may include one or more memory modules. The memory 220 may include executable instructions, data referenced by such executable instructions, and/or any other data that may beneficially be made readily accessible to the processor 210.

The smartphone 126 may further include a data store 230, which may be non-volatile memory such as a hard drive, flash memory, and/or the like. The data store 230 may include one or more data storage elements. The data store 230 may store executable code such as an operating system and/or various programs to be run on the smartphone 126. The data store 230 may further store data to be used by such programs. For the system and method of the present invention, the data store 230 may store computer executable code associated with an assessment module 232, a text analytics module 238, a filtering module 235, a comparison module 234, a recommendation module 236, and a competitivity score generating module 233. The data store 230 may further include data associated with descriptive terms 241 related to a target product and/or a competing product, relevant descriptive terms 242 associated with either of the target product or a competing product, a competitivity score 239, and an actionable report 237. This data stored by the data store 230 may be maintained on the data store 230 for any length of time and some data may be created or overwritten at any time to facilitate the methods described herein.

The smartphone 126 may further include one or more wired transmitter/receivers 240, which may facilitate wired communications between the smartphone 126 and any other device, such as the other computing devices 120, the servers 150, and/or the routers 130 of FIG. 1. The wired transmitter/receivers 240 may communicate via any known wired protocol, including but not limited to any of the wired protocols described in FIG. 1. In some embodiments, the wired transmitter/receivers 240 may include Ethernet adapters, universal serial bus (USB) adapters, and/or the like.

The smartphone 126 may further include one or more wireless transmitter/receivers 250, which may facilitate wireless communications between the smartphone 126 and any other device, such as the other computing devices 120, the servers 150, and/or the routers 130 of FIG. 1. The wireless transmitter/receivers 250 may communicate via any known wireless protocol, including but not limited to any of the wireless protocols described in FIG. 1. In some embodiments, the wireless transmitter/receivers 250 may include Wi-Fi adapters, Bluetooth adapters, cellular adapters, and/or the like. Either of the wired transmitter/receiver(s) 240 or wireless transmitter/receiver(s) 250 may be associated with a network interface device (NID) 280. The network interface device 280 may provide connectivity to, via the Internet, any network, e.g., a wide area network (WAN), a local area network (LAN), wireless local area network (WLAN), a wireless personal area network (WPAN), a wireless wide area network (WWAN), or other networks.

The smartphone 126 may further include one or more user inputs 260 that receive input from a user such as the any of the users 110 of FIG. 1. The users 110 described herein, may be referred to as a seller of a target product. The user inputs 260 may be integrated into the smartphone 126, or may be separate from the smartphone 126 and connected to it by a wired or wireless connection, which may operate via the wired transmitter/receivers 240 and/or the wireless transmitter/receivers 250. The user inputs 260 may include elements such as a touch screen, buttons, keyboard, mouse, trackball, track pad, stylus, digitizer, digital camera, microphone, and/or other user input devices known in the art.

The smartphone 126 may further include one or more user outputs 270 that provide output to a user such as any of the users 110 of FIG. 1. The user outputs 270 may be integrated into the smartphone 126, or may be separate from the smartphone 126 and connected to it by a wired or wireless connection, which may operate via the wired transmitter/receivers 240 and/or the wireless transmitter/receivers 250. The user outputs 270 may include elements such as a display screen, speaker, vibration device, LED or other lights, and/or other output devices known in the art. In some embodiments, one or more of the user inputs 260 may be combined with one or more of the user outputs 270, as may be the case with a touch screen. In an embodiment, the user outputs 270 may present to a user a graphical user interface by which the user may interact with the smartphone 126 in order to affect the methods and processes described herein.

The smartphone 126 may include various other components not shown or described herein. Those of skill in the art will recognize, with the aid of the present disclosure, that any such components may be used to carry out the present invention, in addition to or in the alternative to the components shown and described in connection with FIG. 2A.

The smartphone 126 may be capable of carrying out the present invention in a standalone computing environment, i.e., without relying on communication with other devices such as the other computing devices 120 or the servers 150. The present specification further contemplates that any of the assessment module 232, competitivity score generating module 233, comparison module 234, filtering module 235, recommendation module 236, and text analytics module 238 may be distributed amongst a number of computing devices (e.g., computing devices 120 of FIG. 1) and/or amongst any server (e.g., 150 of FIG. 1). In other embodiments, the present invention may be utilized in different computing environments. One example of a client/server environment will be shown and described in connection with FIG. 2B.

Figure 2B:
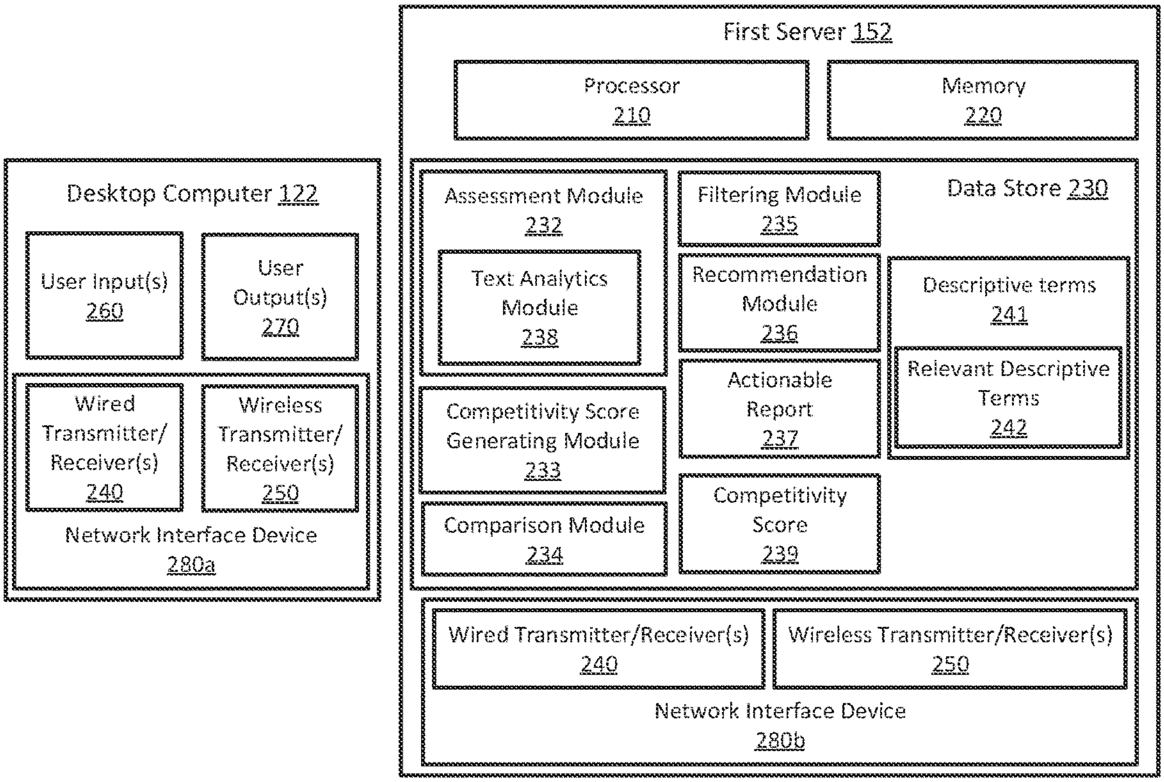
FIG. 2B is a schematic block diagram illustrating a computing device in the form of the desktop computer of FIG. 1, and a server in the form of the first server of FIG. 1, which may cooperate to enable practice of the invention with client/server architecture.

Referring to FIG. 2B, a schematic block diagram illustrates a computing device in the form of the desktop computer 122 of FIG. 1, and a server in the form of the first server 152 of FIG. 1, which may cooperate to enable practice of the invention with client/server architecture. As shown, the desktop computer 122 may be a "dumb terminal," made to function in conjunction with the first server 152.

Thus, the desktop computer 122 may have only the hardware needed to interface with a user (such as the first user 112 of FIG. 1) and communicate with the first server 152. Thus, the desktop computer 122 may include one or more user inputs 260, one or more user outputs 270, one or more wired transmitter/receivers 240, and/or one or more wireless transmitter/receivers 250. Again, either of the wired transmitter/receiver(s) 240 or wireless transmitter/receiver(s) 250 may be associated with a NID 280*a*. The NID 280*a* may provide connectivity to, via the Internet, any network, e.g., a wide area network (WAN), a local area network (LAN), wireless local area network (WLAN), a wireless personal area network (WPAN), a wireless wide area network (WWAN), or other networks in which the first server 152 forms a part of. These components may be as described in connection with FIG. 2A.

Computing functions (apart from those incidents to receiving input from the user and delivering output to the user) may be carried out wholly or partially at the first server 152. Thus, the processor 210, memory 220, data store 230, wired transmitter/receivers 240, and wireless transmitter/receivers 250 may be housed in the first server 152. These components may also be as described in connection with FIG. 1A.

In operation, the desktop computer 122 may receive input from the user via the user inputs 260. The user input may be delivered to the first server 152 via the wired transmitter/receivers 240 and/or wireless transmitter/receivers 250. This user input may be further conveyed by any intervening devices, such as the first router 132 and any other devices in the local area network 142 that are needed to convey the user input from the first router 132 to the first server 152.

The first server 152 may conduct any processing steps needed in response to receipt of the user input. Then, the first server 152 may transmit user output to the user via the wired transmitter/receivers 240, and/or wireless transmitter/receivers 250. This user output may be further conveyed by any intervening devices, such as the first router 132 and any other devices in the local area network 142 (or, alternatively, a wide area network 144) that are needed to convey the user output from the first server 152 to the first router 132. The user output may then be provided to the user via the user outputs 270. In an embodiment, the user outputs 270 may present to a user a graphical user interface that, according to the methods described herein, display a listing of relevant descriptive terms 242 of the target product and competitive product as well as display an actionable report that describes a projected performance of the target product in a computer-networked marketplace relative to the at least one organic competing product also presented on the computer-networked marketplace.

Figure 3:
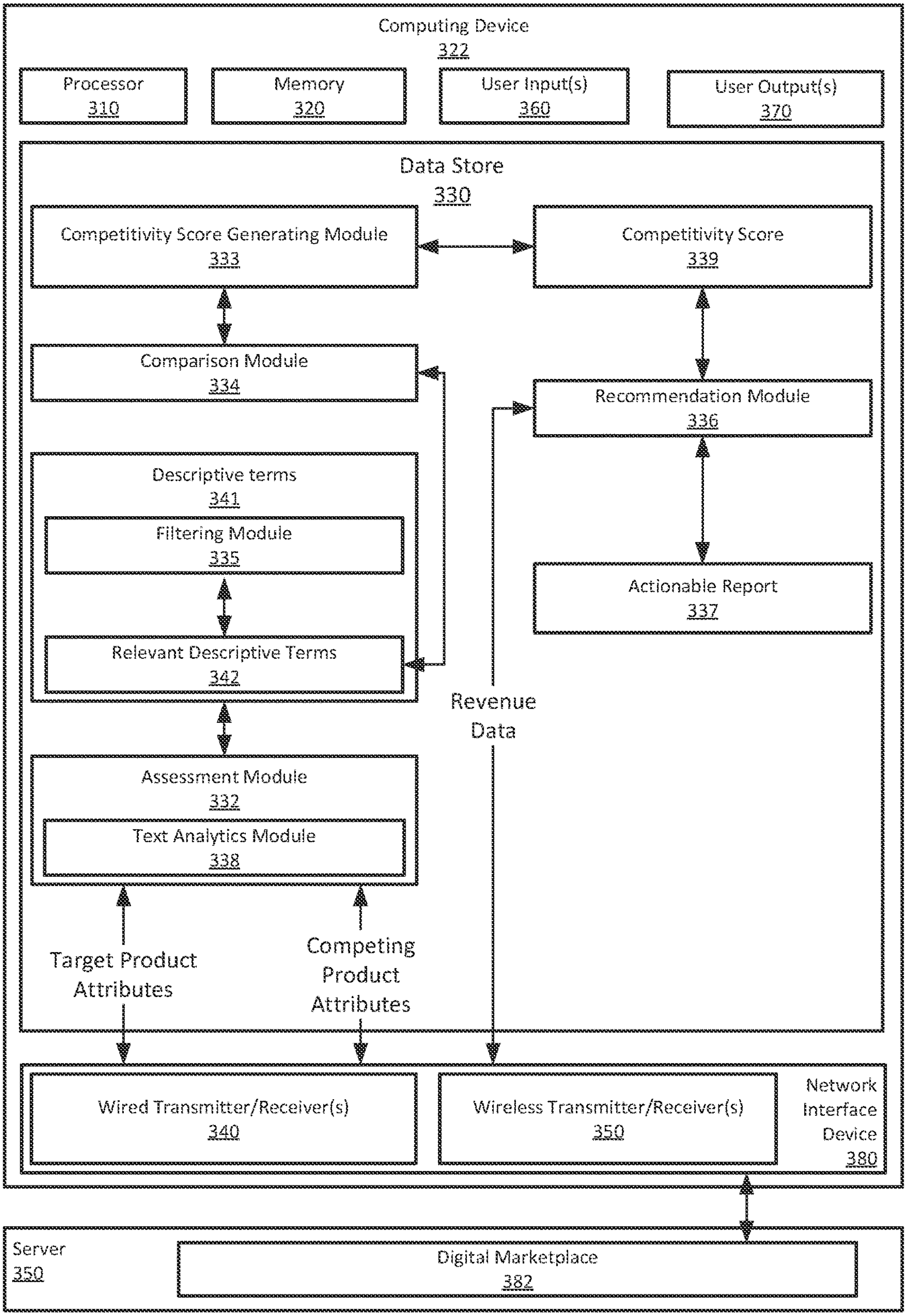
FIG. 3 is a schematic block diagram illustrating a computing device and a server in operating a digital marketplace, which may cooperate to enable practice of the invention with client/server architecture.

Referring to FIG. 3, a schematic block diagram illustrating a computing device 322 (similar to any one of the computing devices shown in FIG. 1) and a server 350 (similar to any of the servers shown in FIG. 1) operating a digital marketplace, which may cooperate to enable practice of the invention with client/server architecture, according to one embodiment of the invention. As shown, the computing device 322 may be operatively coupled to the server 350 via the NID 380 as descried herein. This operative coupling allows the computing device 322 to access, when appropriate, a digital marketplace 382 on which a target product and competitive product are sold. The digital marketplace 382 may be any network accessible website that lists a number of products that, when accessed by a user, allows a user to review products, rate products, purchase products among other tasks associated with digital commerce. The digital marketplace 382 may be managed by companies that include Ebay®, Amazon®, Wayfair®, Costco®, Walmart®, and Target®, among others. Upon purchase of a product, a consumer may have the purchased product sent to the consumer's home or business for consumption. In an embodiment, the digital marketplace 382 may be any of a plurality of websites that the server 350 provides storage and processing resources for.

As described herein, the computing device 322 may include a processor 310, a memory 320, user inputs 360, user outputs 370 and a data store 330 that operate similar to those similar elements described in connection with FIGS. 2A and 2B. The data store 330 may include those modules described herein including an assessment module 332, a competitivity score generating module 333, a comparison module 334, a filtering module 335, a recommendation module 336, and a text analytics module 338.

During operation, the assessment module 332 may assess certain attributes of a target product. The target product as described herein is a specific target product a user (e.g., seller) of the computing device 322 is seeking to discover the competitivity of the product within a certain market. For example, the target product may be a product the user is selling or would like to sell on the digital marketplace 382 hosted by the server 350. In order to know the target products competitiveness, the assessment module 332 may access certain data about the target product present on the server 350. The data may be accessed by the assessment module 332 by sending data requests via the NID 380 either via a wired (e.g., via the wired transmitter/receiver(s) 340)) or a wireless (e.g., via the wireless transmitter/receiver(s) 350) connection.

The data request may be a request for attributes regarding the target product. Although any number of attributes about the target product may be requested, the assessment module 332 may request specific attributes that will be used to develop an actionable report 337 regarding the competitivity of the target in the digital marketplace 382. A first attribute may be descriptive of the ratings provided by at least one purchaser of the target product on the digital marketplace 382. Often, digital marketplaces 382 provide graphical user interfaces (GUIs) to consumers that allows those consumers to rate the products they purchase on the digital marketplace 382. In a specific embodiment, a 5-star starring system may be used by a consumer/purchaser of the target product to rate the target product. A one-star rating would indicate a poor assessment by the consumer/purchaser of the target product while a 5-star rating would indicate a very good assessment of the target product by the consumer/purchaser. The assessment module 332 may, therefor, take each star-rating or an average of those star-ratings as input for use in creating the actionable report 337.

A second attribute may include the reviews associated with the target product. Again, digital marketplaces 382 often provide a GUI that allow the consumer of the target product to enter text descriptive of the consumers' experiences with the target product. This text may include specific positive keywords or negative keywords that describe the consumers' experience with the target product. With this data, the assessment module 332 may cause a text analytics module 338 to, in an embodiment, parse each review for these keywords that describe the target product. Still further, the text analytics module 338 may also extract keywords descriptive of o certain features of the target product. As an example, the wording "ergonomic handle" may be extracted by the text analytics module 338 describing not only that the target product includes a handle, but that that handle is an "ergonomic" handle giving a perception that the consumer giving that review likes the fit or feel of the target product.

A third attribute may be similar to the second attribute in that the assessment module 332 determines the number of the reviews associated with the target product presented on the digital marketplace 382. The number of reviews may indicate a level of involvement with the target product either for the disparaging of the target product or the approval of the target product. Along with the textual substance of these reviews, the number of reviews associated with the target product may be used to help create the actionable report based on the involvement within the digital marketplace 382 with the target product.

A fourth attribute may include the listed price of the target product. Although the amount charged to purchase a product may not be indicative of the value of the target product, the charged amount relative to other similar competing products may be indicative of its worth or current price point (whether incorrect or correct).

A fifth attribute may also include a ranking of the target product relative to at least one organic competing product. This ranking may be a result of an average or accumulative rating of the target product relative to the organic competing product. Often, the digital marketplaces 382 allow purchasers to list organic competing products and the target product by an average rating. By doing so the assessment module 332 may understand the ranking of the target product relative to the at least one organic competing product and use this information to develop the actionable report 337.

The assessment module 332 may also determine similar attributes of an at least one organic competing product similar to those attributes discovered by the assessment module 332 for the target product. In the context of the present specification the term "organic competing product" is meant to be understood as any product that, based on consumer reviews, is ranked on the digital marketplace 382. An "organic" competing product is therefore a naturally ranked product based on those reviews provided by past consumers as opposed to those products that o may be given "top shelf" preference after payment to achieve such status. This organic ranking nature of products on the digital marketplace 382 is often done to provide potential consumers with evidence that others appreciate that product. A "competing" product is any product that is similar to the target product but sold by another seller apart from the seller of the target product. The "similarity" of the target product relative to the at least one organic competing product is dependent on the data obtained by the text analytics module 338 and specifically the analysis of descriptive terms 341 associated with each of these types of products. In a specific embodiment, the text analytics module 338 may also obtain descriptive data associated with each target product and organic competing product per their listing. Again, digital marketplaces 382 allow descriptions of products to be posted alongside each product that describes is functionalities, its physical characteristics, and its alleged advantages as superior products. All of this is presented to a potential consumer on a GUI as textual information used to entice the consumer to purchase the products. The text analytics module 338 may analyze this text and, using a parsing process, extract keywords used to compare the text associated with the target product to the text associated with the organic competing product.

When the computing device 322, via the assessment module 332, has obtained the attributes associated with the target product and the at least one organic competing product, the descriptive terms 341 describing these attributes may be listed for consumption by, in an embodiment, a filtering module 335. The filtering module 335 may be used to filter the descriptive terms 341 to only those relevant descriptive terms 342 that have resulted in the purchase of the target product in the digital marketplace 382. For example, some descriptive terms 341 may, rightly or wrongly, include a color or color scheme of the target product or organic competing product. Although some consumers may appreciate a specific color of a product, these may not be deciding factors used to entice a consumer to purchase the target product or organic competing product. This may be especially true where, as indicated by purchase histories associated with the target product or organic competing product indicate that any particular color of product was not overwhelming purchased over another color. In this specific example, although the color of the product is a descriptive term 341 the text analytics o module 338 had parsed out from the products, it may not necessarily be a relevant descriptive term 341 and such information may be filtered out by the filtering module 335 to obtain only those relevant descriptive terms 342 associated with any of the target product or organic competing product.

In a more general example, the filtering module 335 may narrow down the descriptive terms 341 of interest by analyzing metrics collected on sufficiently "mature" keywords (e.g., sales >2) as budding keywords that may lack sufficient data to influence predictions in purchasing the target product or organic competing product. The click-rate and conversion rate (clicks that result in a purchase) associated with any given product may be taken into consideration based on the keywords used to search for the products. In these examples, a lack of data regarding a specific descriptive term 341 may also filter out that specific descriptive term 341 in order to obtain the relevant descriptive terms 342 as described herein. It is also appreciated that the descriptive terms 341 may be filtered by the filtering module 335 based on any other reason to obtain relevant descriptive terms 342 and the present specification contemplates these other reasons.

With the relevant descriptive terms 342 being determined, these relevant descriptive terms 342 may be sent to a comparison module 334 to compare those relevant descriptive terms 342 of the target product to those relevant descriptive terms 342 associated with the at least one organic competing product. Although the present specification describes this comparison process as being conducted between a single organic competing product (e.g., "at least one") to the target product, any number of organic competing products may be compared to the target product. In a specific example, the top 10 ranked organic competing products may be compared to the target product by the comparison module 334.

During execution of the comparison module 334 by the processor 310, the descriptive terms 341 may be compared to generate, with a competitivity score generating module 333 executed by the processor 310, a competitivity score 339. In an embodiment, the competitivity score may use any process or algorithm used to define how the target product can or cannot compete with any of the discovered organic competing products.

During operation, a recommendation module 336 may receive this competitivity score 339 along with other data from the digital marketplace 382 hosted by the server 350. Among this other data may include revenue data associated with the organic competing products and the target product (if available). For example, where a click-rate of any given product (e.g., target product or organic competing product) results in a purchase, this conversion rate data along with the pricing data of the products may be passed to the recommendation module 336. The recommendation module 336 may then provide a recommendation descriptive of the ability (or inability) of the target product to compete with the at least one organic competing product. In an example, a threshold competitivity score may be set such that the report provided by the recommendation module 336 indicates to the seller of the target product whether to proceed to sell that product on the digital marketplace 382. Alternatively, where the competitivity score has not met the threshold the competitivity score generating module 333 may not forward the competitivity score onto a recommendation module 336 to generate the actionable report 337. Alternatively, or additionally, where the competitivity score has not met the threshold the competitivity score generating module 333 may pass a threshold failure signal onto to the recommendation module 336 indicative of a non-competitive status of the target product. When the threshold competitivity score is not reached, the recommendation module 336 may provide an indication to the seller that it is not recommended that the seller initiate or continue to sell the target product on the digital marketplace 382.

Where the threshold competitivity score is reached, the recommendation module 336 may provide additional economic data descriptive of price points and ACoS statistics to use in order to increase revenue. Again, a seller of the target product may not know what appropriate target advertising cost of sale (ACoS) to meet or exceed and what price point to sell the target product at in order to see long term gains in lieu of short-term profits. The recommendation module 336 provides this information based on the competitivity score 339 generated by the competitivity score generating module 333 and revenue data received from the digital marketplace 382. In a specific example, the revenue potential of the target product may be determined by the recommendation module 336 calculating an ad spend margin, an ad spend potential, and a revenue potential. The ad spend margin may be calculated by multiplying a target ACoS by the price of the target product. A target ACoS may be determined and set by the seller based on available capitol or may be set by the seller based on the fraction of the revenue received thus far from the sale of the target product on the digital marketplace 382 and costs of manufacturing. Ad spend potential may then be calculated by multiplying monthly opportunity units (OU) by the spend margin. The monthly OUs may be calculated as a result of the conversion rate of clicks to the target product that is the results of sales of the target product after a purchaser has viewed the product. The revenue potential may then be calculated by multiplying the OU with the price of the target product. This revenue potential of each of the target products and organic competing products may be ranked to determine the placement of the target product within the digital marketplace 382.

In an embodiment, the recommendation (e.g., the actionable report 337) presented by the recommendation module 336 may be refined by inputting an estimated bid amount from the digital marketplace 382 required to "win" advertising slots for the target product. The digital marketplace 382, along with selling products, may also engage in presenting advertisements to a potential purchaser of one or more products. These advertisements may be presented in a banner or other sub-section of the GUI presented to the purchaser or as a pop-up window advertisement. These forms of advertisements present, in real-time, alternative products for which the potential purchaser is seeking to purchase. These advertisements may present the target product and persuade the purchaser to purchase the target product rather than a competitors' products. Thus, investments may be required to increase the purchasing instances of the target product. The present systems and methods may also present to the seller of the target product, on the actionable report 337, how much additional investment may be needed to win advertising slots based on the keywords associated with the target product and entered into a search by a potential user. For example, the investment needed may be calculated by multiplying the projected bid amount by the product of the click rate of the target product and the impressions (e.g., uses) for specific keywords associated with the target product and the organic competing product used to search for those products. A return on investment (ROI) may then be calculated by subtracting the investment needed from an investment payoff term and multiplying that by the ad spend potential. Products with no (or low) destiny potential receive suggestion outputs as to why they are not competitive or have bad conversion rates by the recommendation module 336 and its actionable report 337, so that these attributes of the target product can be improved for future destiny potential or the money spent to sell the target product can be reallocated for other uses.

Figure 4:
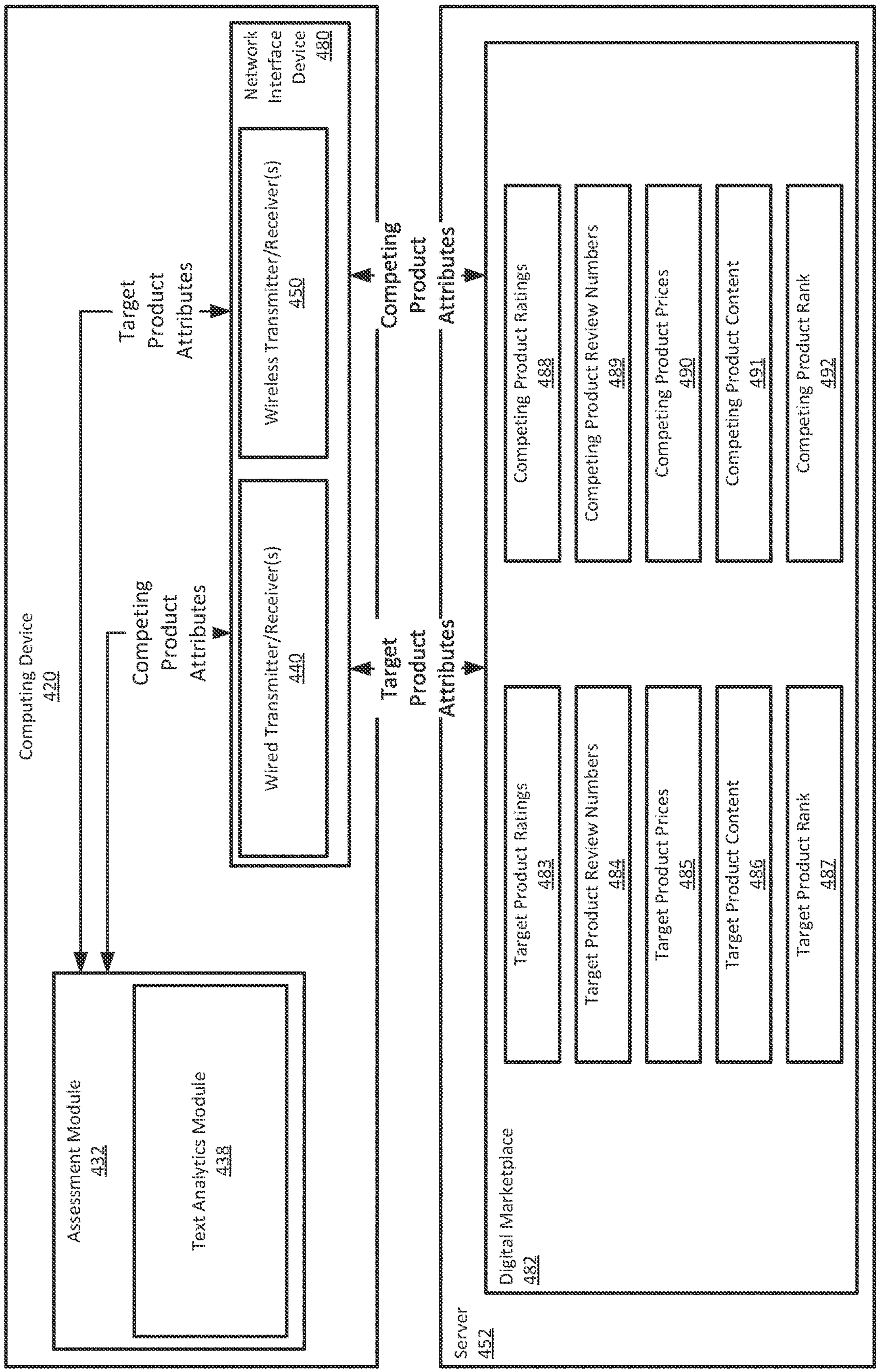
FIG. 4 is a schematic block diagram illustrating a computing device and a server in hosting a digital marketplace that includes attributes of a target product and a competing product, which may cooperate to enable practice of the invention with client/server architecture.

FIG. 4 is a schematic block diagram illustrating a computing device 420 and a server 452 in hosting a digital marketplace 482 that includes attributes of a target product and a competing product, which may cooperate to enable practice of the invention with client/server architecture. As described herein, the assessment module 432 may assess certain attributes of a target product. The target product as described herein is a specific target a user (e.g., seller) of the computing device 420 is seeking to discover the competitivity of the product within a certain market. For example, the target product may be a product the user is selling or would like to sell on the digital marketplace 482 hosted by the server 452. In order to know the target products competitiveness, the assessment module 432 may access certain data about the target product present on the server 452. The data may be accessed by the assessment module 432 by sending data requests via the NID 480 either via a wired (e.g., via the wired transmitter/receiver(s) 440)) or a wireless (e.g., via the wireless transmitter/receiver(s) 450) connection.

The data request may be a request for attributes regarding the target product. Although any number of attributes about the target product may be requested, the assessment module 432 may request specific attributes that will be used to develop an actionable report regarding the competitivity of the target in the digital marketplace 482. A first attribute may be descriptive of the ratings 483 provided by at least one purchaser of the target product on the digital marketplace 482. Often, digital marketplaces 482 provide graphical user interfaces (GUIs) to consumers that allows those consumers to rate the products they purchase on the digital marketplace 482. In a specific embodiment, a 5-star starring system may be used by a consumer/purchaser of the target product to rate the target product. A one-star rating would indicate a poor assessment by the consumer/purchaser of the target product while a 5-star rating would indicate a very good assessment of the target product by the consumer/purchaser. The assessment module 432 may, therefor, take each star-rating or an average of those star-ratings as input for use in creating the actionable report.

A second attribute may include the content 486 of the reviews and description associated with the target product. Again, digital marketplaces 482 often provide a GUI that allow the consumer of the target product to enter text descriptive of the consumers' experiences with the target product. This text may include specific positive keywords or negative keywords that describe the consumers' experience with the target product. With this data, the assessment module 432 may cause a text analytics module 438 to, in an embodiment, parse each review for these keywords that describe the target product. Still further, the text analytics module 438 may also extract keywords descriptive of certain features of the target product. As an example, the wording "ergonomic handle" may be extracted by the text analytics module 438 describing not only that the target product includes a handle, but that that handle is an "ergonomic" handle giving a perception that the consumer giving that review likes the fit of the target product.

A third attribute may be the number of the reviews 484 associated with the target product presented on the digital marketplace 482. The number of reviews 482may indicate a level of involvement with the target product either for the disparaging of the target product or the approval of the target product. Along with the textual substance of these reviews, the number of reviews associated with the target product may be used to help create the actionable report based on the involvement within the digital marketplace 482 with the target product.

A fourth attribute may include the listed price 485 of the target product. Although the amount charged to purchase a product may not be indicative of the value of the target product, the changed amount relative to other similar competing products may be indicative of its worth or current price point (whether incorrect or correct).

A fifth attribute may also include a ranking 487 of the target product relative to at least one organic competing product. This ranking may be a result of an average or accumulative rating of the target product relative to the organic competing product. Often, the digital marketplaces 382 allow purchasers to list organic competing products and the target product by an average rating. By doing so the assessment module 432 may understand the ranking of the target product relative to the at least one organic competing product and use this information to develop the actionable report.

Each of these target product attributes may be requested by the computing device 420 and its assessment module 432 and delivered by the server 452 upon request. Even further, similar attributes related to at least one organic competing product may also be requested by and sent to the computing device 420. These organic product attributes may include competing product ratings 488, competing product review numbers 489, competing product prices 490, competing product content 491, and competing product rank 492. Each of these competing product attributes may be similar to those attributes associated and described herein in connection with the target product.

Figure 5:
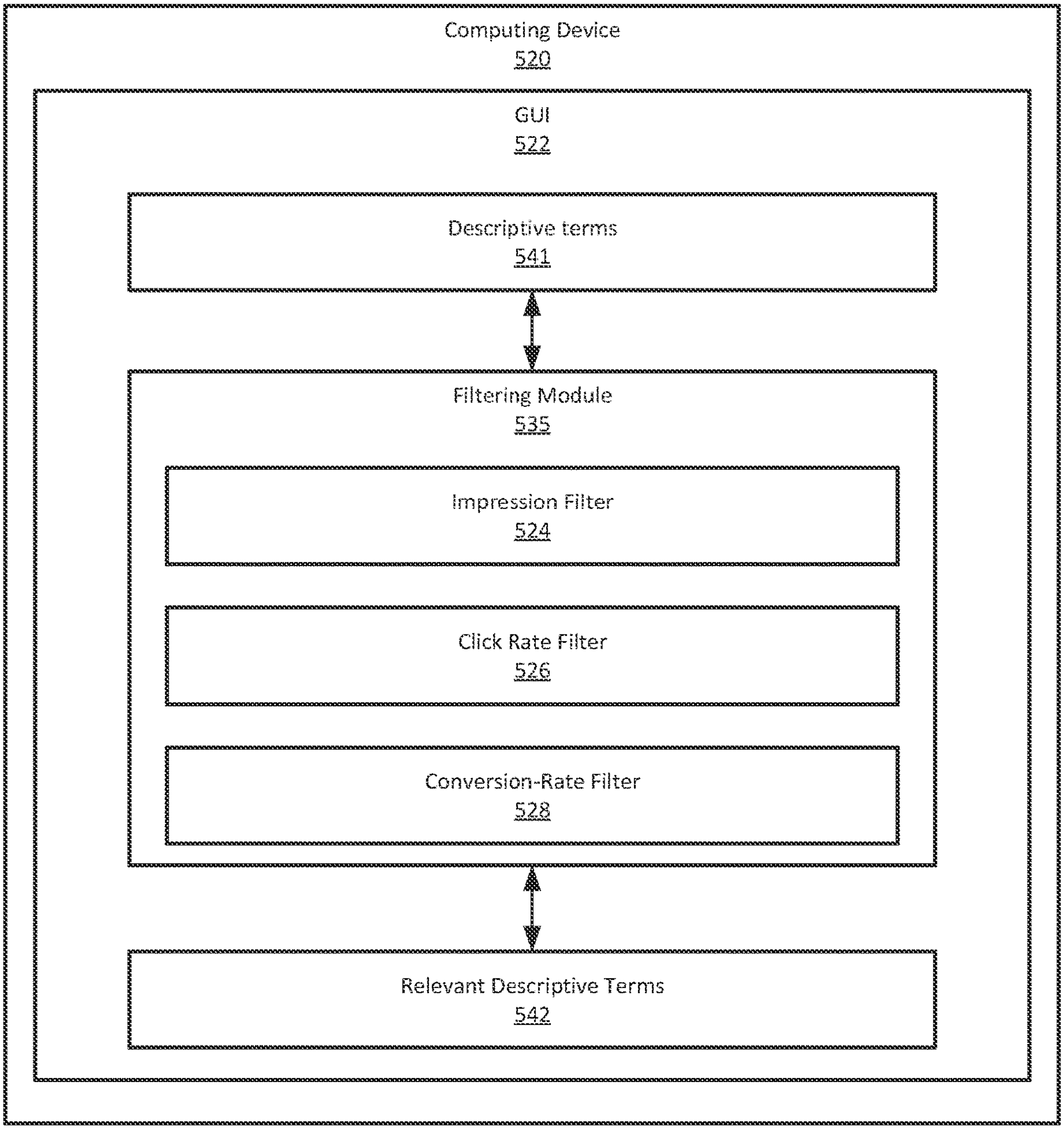
FIG. 5 is a schematic block diagram illustrating a computing device that includes a graphic user interface used to enable practice of the invention within a client/server architecture.

FIG. 5 is a schematic block diagram illustrating a computing device 520 that includes a graphic user interface 522 used to enable practice of the invention within a client/server architecture. The graphic user interface 522 may be used by a seller of a target product to evaluate the competitivity of the target product as described herein. As described herein, the computing device 520 includes a filtering module 535. The filtering module 535 may be used to filter the descriptive terms 541 to only those relevant descriptive terms 542 that have resulted in the purchase of the target product in the digital marketplace.

The filtering module 535 may include a number of types of filters to filter the descriptive terms 541 into the relevant descriptive terms 542. These filters may include an impression filter 524, a click-rate filter 526, and a conversion-rate filter 528 each of which may result in the removal of descriptive terms 541 that do not result in purchases of the target product or any organic comparison product. As described herein, the impression filter 524 may be provided with a number of times an ad associated with the target product or competing product (whether it's a banner, button, or text link) has been (or will be) exposed to a potential purchaser and has resulted in a purchase of that product. The impression filter 524 may therefore, filter out those instances where a potential purchaser did not see or was not shown an ad but did result in a purchase. Click-rate filter 526 may filter out those descriptive terms that, despite the wording of the ad, did not result in a selection of the ad or a purchase of the product. The conversion-rate filter 528 may filter out those descriptive terms that, despite the wording of the ad and a selection by the potential purchaser of the ad, did not result in a purchase of the product.

By filtering the descriptive terms via the filtering module 535 and its associated filters 524, 526, 528, the GUI 522 may be able to display to a seller of the target product those relevant descriptive terms 542 that apply in the analysis of how competitive the target product is. Although FIG. 5 shows the use of specific filters 524, 526, 528 to filter the descriptive terms 541, the present specification contemplates that the descriptive terms 541 may be filtered using any criteria.

Figure 6:
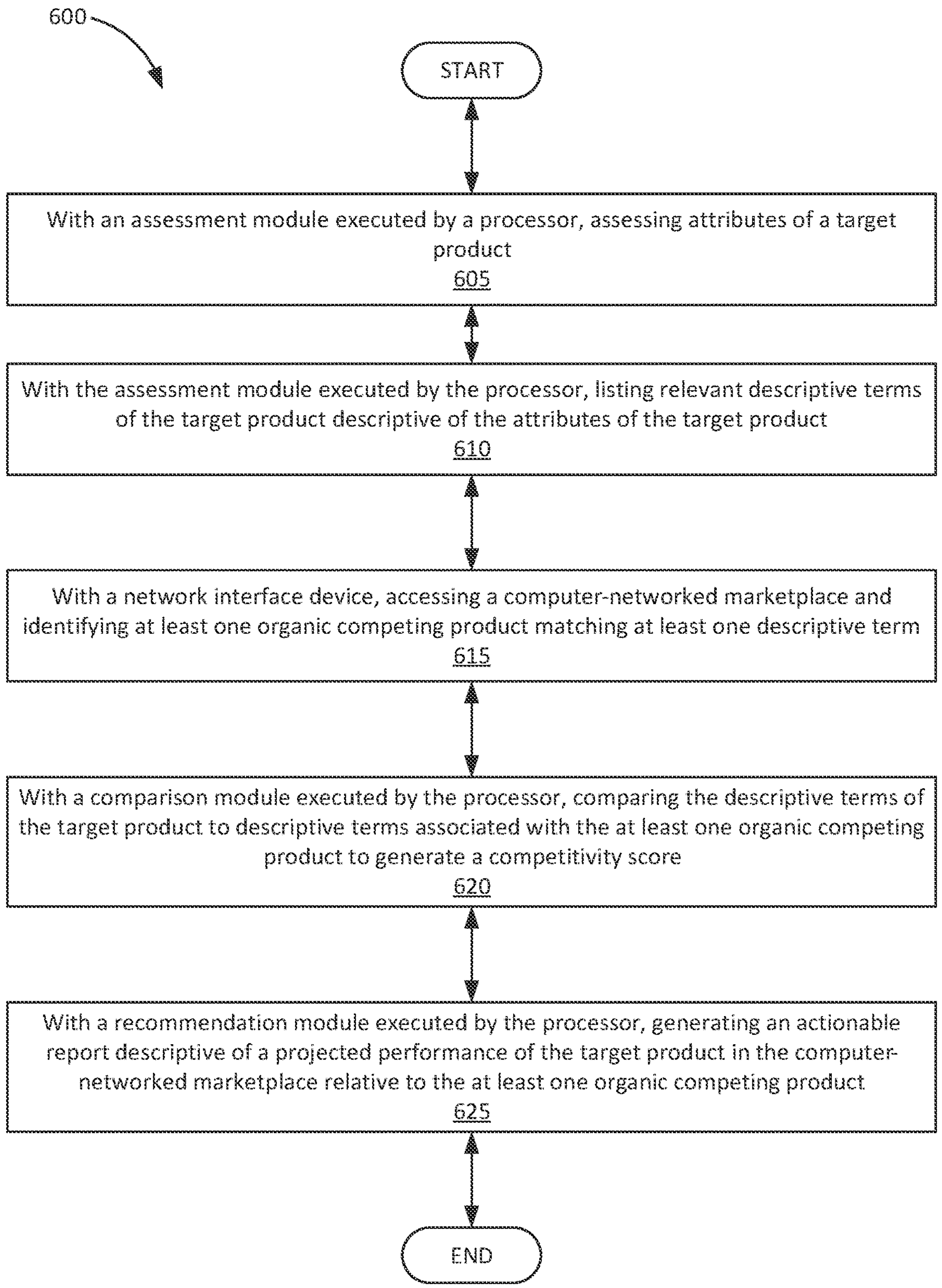
FIG. 6 is a flowchart diagram illustrating a method of evaluating a product, according to one embodiment of the invention.

FIG. 6 is a flowchart diagram illustrating a method 600 of evaluating a product, according to one embodiment of the invention. The method 600 may begin at block 605 with assessing attributes of a target product using an assessment module executed by a processor. As described herein, the assessment of the target product (or any other competing product) may indicate certain attributes of the target product. Although any number of attributes about the target product may be requested, the assessment module may request specific attributes that will be used to develop an actionable report regarding the competitivity of the target in the digital marketplace.

At block 610, the method 600 may further include listing relevant descriptive terms of the target product descriptive of the attributes of the target product. This listing of the relevant descriptive terms may also be conducted by the assessment module being executed by the processor of the computing device. This list of relevant descriptive terms, in an embodiment, may have been generated based on the filtering of all descriptive terms generated for the target product as described herein. There may be some irrelevant information that may be filtered out of the descriptive terms generated from the attributes of the target product that would not need to show up in the actionable report.

The method 600 may continue at block 615 with accessing a computer-networked marketplace, via a NID, and identifying at least one organic competing product matching at least one descriptive term. This identification may implement the assessment module to compare the descriptive terms associated with the target product to any generated descriptive terms associated with any organic competing product. In an embodiment, this matching process of descriptive terms related to the target product to descriptive terms related to the organic competing product may be conducted before or after the filtering of descriptive terms by a filtering module as described herein. When conducted before, more organic competing products may be matched where, when conducted after the filtering, relatively less organic competing products may be matched due to the smaller list of relevant descriptive terms.

The method 600 may also include comparing the descriptive terms of the target product to descriptive terms associated with the at least one organic competing product to generate a competitivity score at block 620. This may be done via execution of a comparison module 620 executed by the processor. During execution of the comparison module by the processor, the descriptive terms may be compared to generate, with a competitivity score generating module executed by the processor, a competitivity score. In an embodiment, the competitivity score may use any process or algorithm used to define how the target product can or cannot compete with any of the discovered organic competing products.

At block 625, the method 600 may further include generating an actionable report descriptive of a projected performance of the target product in the computer-networked marketplace relative to the at least one organic competing product. The actionable report may be generated via the execution of a recommendation module by the processor. During operation, a recommendation module may receive this competitivity score along with other data from the digital marketplace hosted by the server. Among this other data may include revenue data associated with the organic competing products and the target product (if available). For example, where a click-rate of any given product (e.g., target product or organic competing product) results in a purchase, this conversion rate data along with the pricing data of the products may be passed to the recommendation module. The recommendation module may then provide a recommendation descriptive of the ability (or inability) of the target product to compete with the at least one organic competing product. In an example, a threshold competitivity score may be set such that the report provided by the recommendation module 336 indicates to the seller of the target product whether to proceed to sell that product on the digital marketplace. Alternatively, where the competitivity score has not met the threshold the competitivity score generating module may not forward the competitivity score onto a recommendation module to generate the actionable report. When the threshold competitivity score is not reached, the recommendation module simply provides an indication to the seller that it is not recommended that the seller initiate or continue to sell the target product on the digital marketplace.

Where the threshold competitivity score is reached, the recommendation module may provide additional economic data descriptive of price points and ACoS statistics to use in order to increase revenue. Again, a seller of the target product may not know what appropriate target ACoS to meet or exceed and what price point to sell the target product at in order to see long term gains in lieu of short-term profits. The recommendation module provides this information based on the competitivity score generated by the competitivity score generating module and revenue data received from the digital marketplace. In a specific example, the revenue potential of the target product may be determined by the recommendation module calculating an ad spend margin, an ad spend potential, and a revenue potential. The ad spend margin may be calculated by multiplying a target ACoS by the price of the target product. A target ACoS may be determined and set by the seller based on available capitol or may be set by the seller based on the fraction of the revenue received thus far from the sale of the target product on the digital marketplace and costs of manufacturing. Ad spend potential may then be calculated by multiplying monthly opportunity units (OU) by the spend margin. The monthly OUs may be calculated as a result of the conversion rate of clicks to the target product that is the results of sales of the target product after a purchaser has viewed the product. The revenue potential may then be calculated by multiplying the OU with the price of the target product. This revenue potential of each of the target products and organic competing products may be ranked to determine the placement of the target product within the digital marketplace.

At this point, the method 600 may end.

Figure 7:
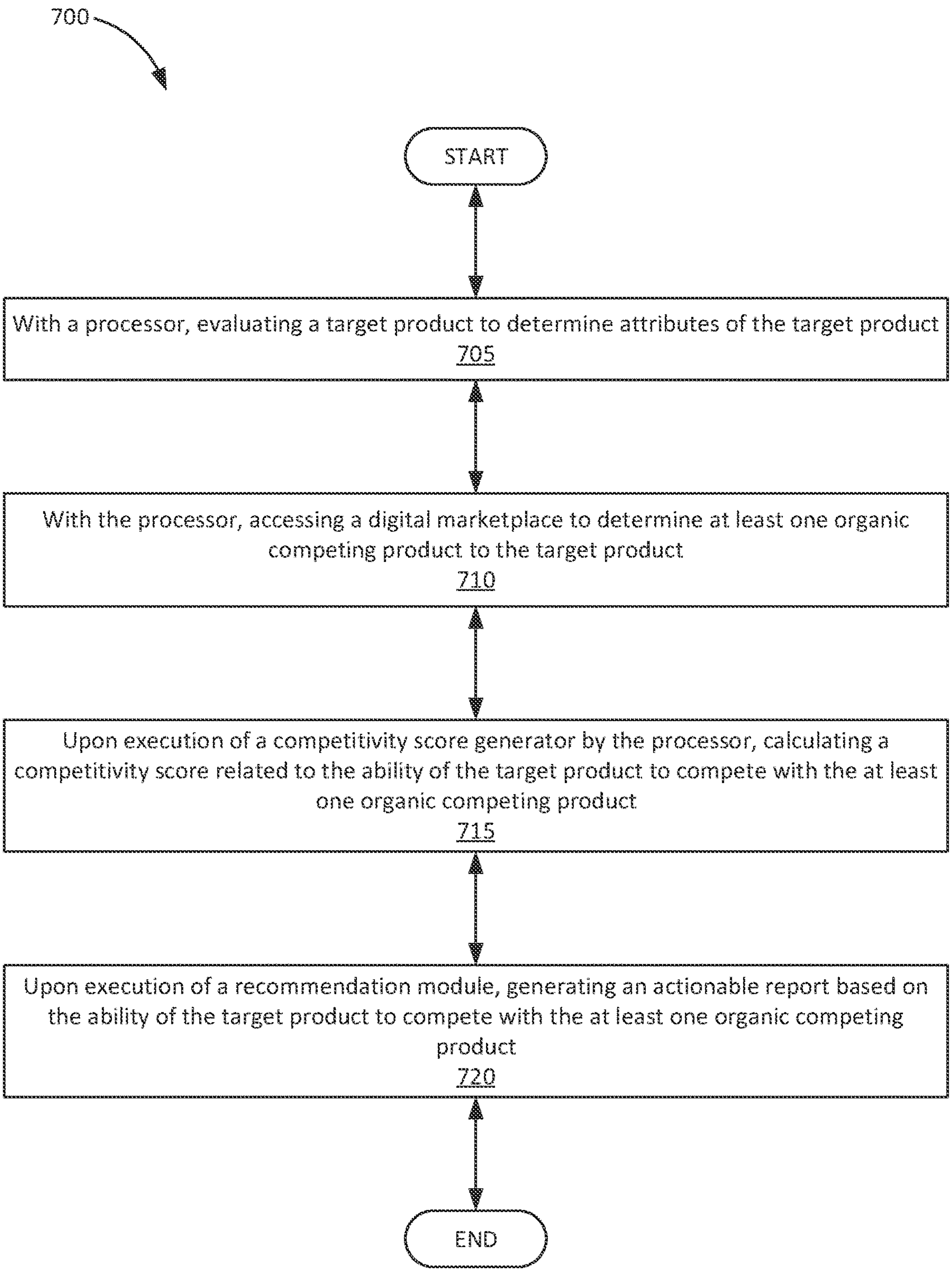
FIG. 7 is a flowchart diagram illustrating a method of providing a competitive assessment of a target product on a marketplace, according to one embodiment of the invention.

FIG. 7 is a flowchart diagram illustrating a method 700 of providing a competitive assessment of a target product on a marketplace, according to one embodiment of the invention. Here, the method 700 may begin with evaluating a target product to determine attributes of the target product at block 705. In an embodiment, the evaluation may be conducted via the execution of an assessment module. In an embodiment, the assessment may be conducted by requesting, at a GUI, descriptive terms regarding the target product. Additionally, or alternatively, the evaluation may be made by an assessment module accessing a digital marketplace to retrieve descriptive terms via a text analytics module as described herein. Additionally, or alternatively, certain input devices such as a digital camera may be used to image the target product and extrapolate certain features of the product such as size, color, texture, among others.

The method 700 may continue at block 710 with accessing the digital marketplace to determine at least one organic competing product to the target product upon execution of the processor. In this embodiment, the assessment module may access certain data about the target product such as the descriptive terms and cross-reference those descriptive terms to determine if at least one descriptive term matches any competing product listed on the digital marketplace.

At block 715, the method 700 may include calculating a competitivity score related to the ability of the target product to compete with the at least one organic competing product. This process may be conducted upon execution of a competitivity score generator by the processor of the computing device accessing the digital marketplace. In an embodiment, the competitivity score may use any process or algorithm used to define how the target product can or cannot compete with any of the discovered organic competing products.

The method 700 may further include generating an actionable report based on the ability of the target product to compete with the at least one organic competing product at block 720. During operation, a recommendation module, executed by the processor, may receive the competitivity score along with other data from the digital marketplace hosted by the server. Among this other data may include revenue data associated with the organic competing products and the target product (if available). For example, where a click-rate of any given product (e.g., target product or organic competing product) results in a purchase, this conversion rate data along with the pricing data of the products may be passed to the recommendation module. The recommendation module may then provide a recommendation descriptive of the ability (or inability) of the target product to compete with the at least one organic competing product. In an example, a threshold competitivity score may be set such that the report provided by the recommendation module indicates to the seller of the target product whether to proceed to sell that product on the digital marketplace. Alternatively, where the competitivity score has not met the threshold the competitivity score generating module may not forward the competitivity score onto a recommendation module to generate the actionable report. When the threshold competitivity score is not reached, the recommendation module simply provides an indication to the seller that it is not recommended that the seller initiate or continue to sell the target product on the digital marketplace. At this point, the method 700 may end.

Figure 8:
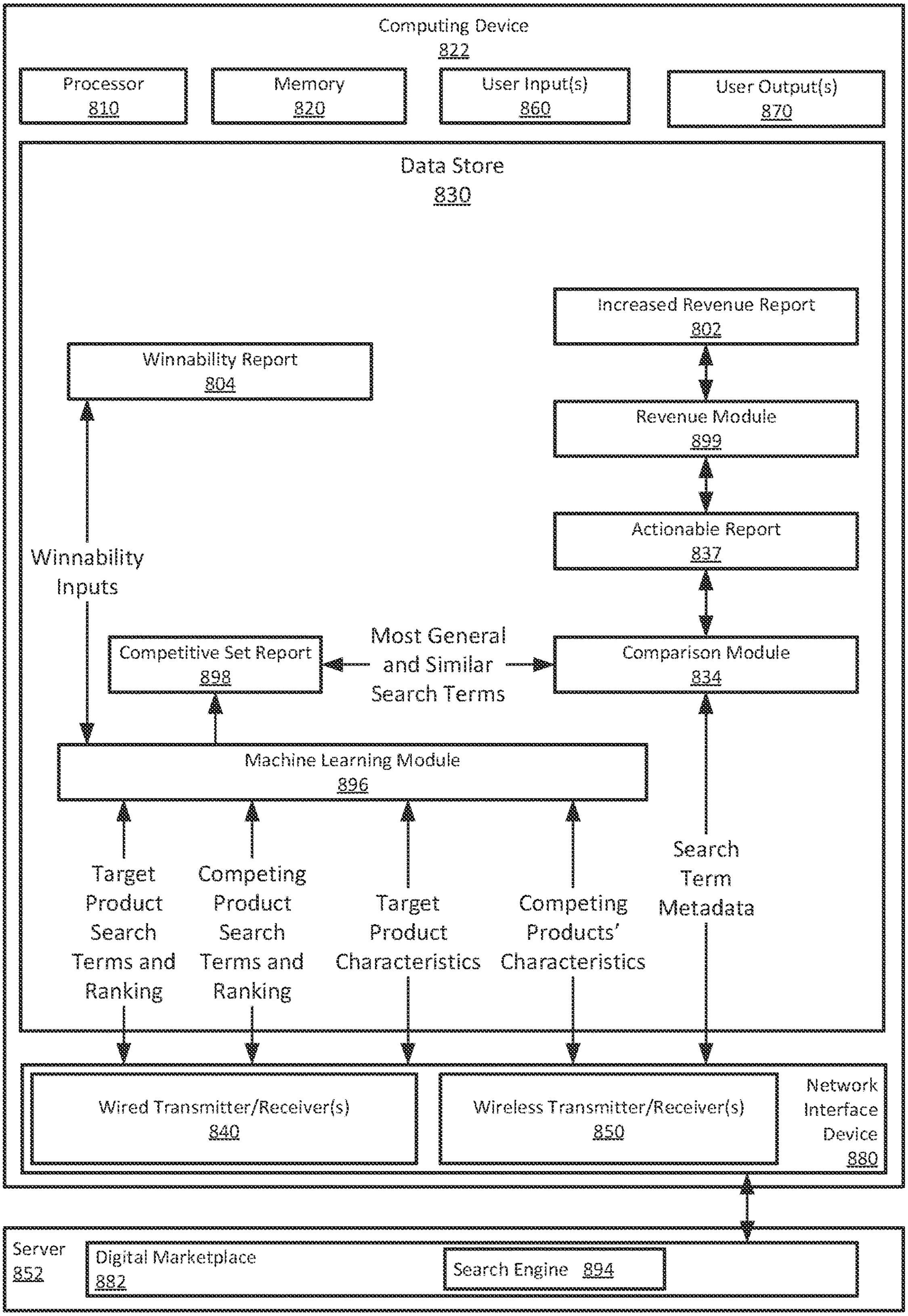
FIG. 8 is a schematic block diagram illustrating a computing device and a server in operating a digital marketplace, which may cooperate to enable practice of the invention with client/server architecture.

FIG. 8 is a schematic block diagram illustrating computing device 822 and a server 852 in operating a digital marketplace 882, which may cooperate to enable practice of the invention with client/server architecture. In addition to providing an actionable report (FIG. 3, 337) regarding the competitivity of the target in the digital marketplace 882 as described in connection with FIGS. 1-7, the present computing device 822 may further describe an actionable report 837 that describes sustainable and feasible growth over time on an ecommerce platform (e.g., the digital marketplace 882) on a product level as well as provide a winnability report 804 descriptive of a probability of winning each search term (e.g., having the target product associated with the search term) at any given point in time along with the estimated costs to win those search terms. The actionable report 837 and winnability report 804 may, in an embodiment, provide a user with an indication as to how to optimize advertising and search engine implementation to increase revenue.

As described herein, the computing device 822 may include a processor 810, a memory 820, user inputs 860, user outputs 870 and a data store 830 that operate similar to those similar elements described in connection with FIGS. 2A and 2B, for example. The data store 830 may include those modules described herein including a comparison module 834, and a revenue module 899.

The computing device 822 described may include any module, data store 830, or data maintained on the computer as those described in connection with FIG. 3 herein. In the embodiments described herein, an actionable report 837 may be provided using a comparison module 834 similar to the comparison module 334 described in connection with FIG. 3. Although these modules (e.g., comparison module 834) may be similar to those described in FIG. 3, the modules in FIG. 8 may perform additional and different processes as described herein in order to provide an actionable report 837 indicating optimized advertising and search engine implementation.

In an embodiment, the computing device 822 may initially determine any competitive products that, at any point in time, compete with the target product. The computing device 822 may do this by accessing a search engine 894 associated with a digital marketplace 882 via the processor 810 and NID 880 of the computing device 822. Upon accessing the search engine 894, the processor 810 may retrieve data descriptive of the frequency of appearance of one or more search terms associated with the target product. Additionally, the processor 810 may obtain data related to the ranking of those search terms. This data may be descriptive of the coincidence that the target product and any competitive product are associated with the same search terms. Still further, this data may be descriptive of how the search terms associated with the target product and each competitive product are similar in their rankings. For example, where the target product is an athletic shoe, some pertinent search terms may include running, hiking, basketball, tennis, sole, laces, and marathon among other potential terms associated with the target product athletic shoe. The data may also include which competing products also rank similarly with these terms. For example, a competing product that matches 9 out of 10 search terms with the target product is "higher ranked" as compared to a competing product that matches 4 out of 10 search terms.

In a specific embodiment, the processor 810 may access this data using, for example, a search query website such as Google® Trends®. These types of websites may be used by the processor 810 to access a number of search queries for specific terms associated with any of the target product and any number of competitive products. The search query websites may be accessed by the processor 810 to automatically access search query inquiries in order to obtain the data used herein by the computing device 822. Although specific search query websites are contemplated herein, the present specification also contemplates that other search query databases may be accessed by the processor 810 whether those databases are accessible by a user via a website or not.

The computing device 822 also includes a machine learning module 896. The machine learning module 896 may build a number of mathematical models that provide a competitive set report 898 describing a competitive set of products that compete with the target product. As with each machine learning module 896, the machine learning module 896 may be "taught" by using, as input, a plurality of sets of target product search terms and rankings as well as a plurality of sets of competing product search terms and rankings. Again, the plurality of sets of target product search terms and rankings as well as a plurality of sets of competing product search terms and rankings may be accessible by the processor 810 either via a specific search query website or database.

The machine learning module 896 in an embodiment may, upon execution by the processor 810, determine such correlations in an embodiment based on any machine learning or neural network methodology known in the art or developed in the future. In a specific embodiment, the machine learning module 896 may implement an unsupervised learning clustering technique. For example, the machine learning module in an embodiment may model the relationships between each plurality of sets of target product search terms and rankings as well as a plurality of sets of competing product search terms and rankings using a layered neural network topology. Such a neural network in an embodiment may include an input layer (e.g., plurality of sets of target product search terms and rankings as well as a plurality of sets of competing product search terms and rankings) including a known, recorded set of values for each of these parameters, settings, indicators, and usage data metrics, and an output layer including a projected optimal competitive set report 898, based on the known, recorded set of values in the input layer. The machine learning module 896 in an embodiment may propagate input through the layers of the neural network to project or predict optimal competitive set report 898 based on the known and recorded search term metrics, and compare these projected values to optimal search terms to be presented in the competitive set report 898. Using a back-propagation method, the machine learning module 896, in an embodiment, may then use the difference between the projected values and the known optimal values to adjust weight matrices of the neural network describing the ways in which changes in each of the search term data metrics are likely to affect the optimal search terms to be presented in the competitive set report 898.

With the output layer, the computing device 822 may provide learned competitive search terms that are determined to be the optimal search terms if any have been designated and based upon the similar and frequent search terms detected at the search engine 894 of the digital marketplace 882 during use of the computing device 822. These resulting learned optimal search terms may be suggested to a user or automatically implemented. Suggestion may come with an indicator and may be shown in a graph at a user interface for, in an embodiment, approval by the user before implementation of the other processes executed by the processor 810 of the computing device 822.

Figure 9:
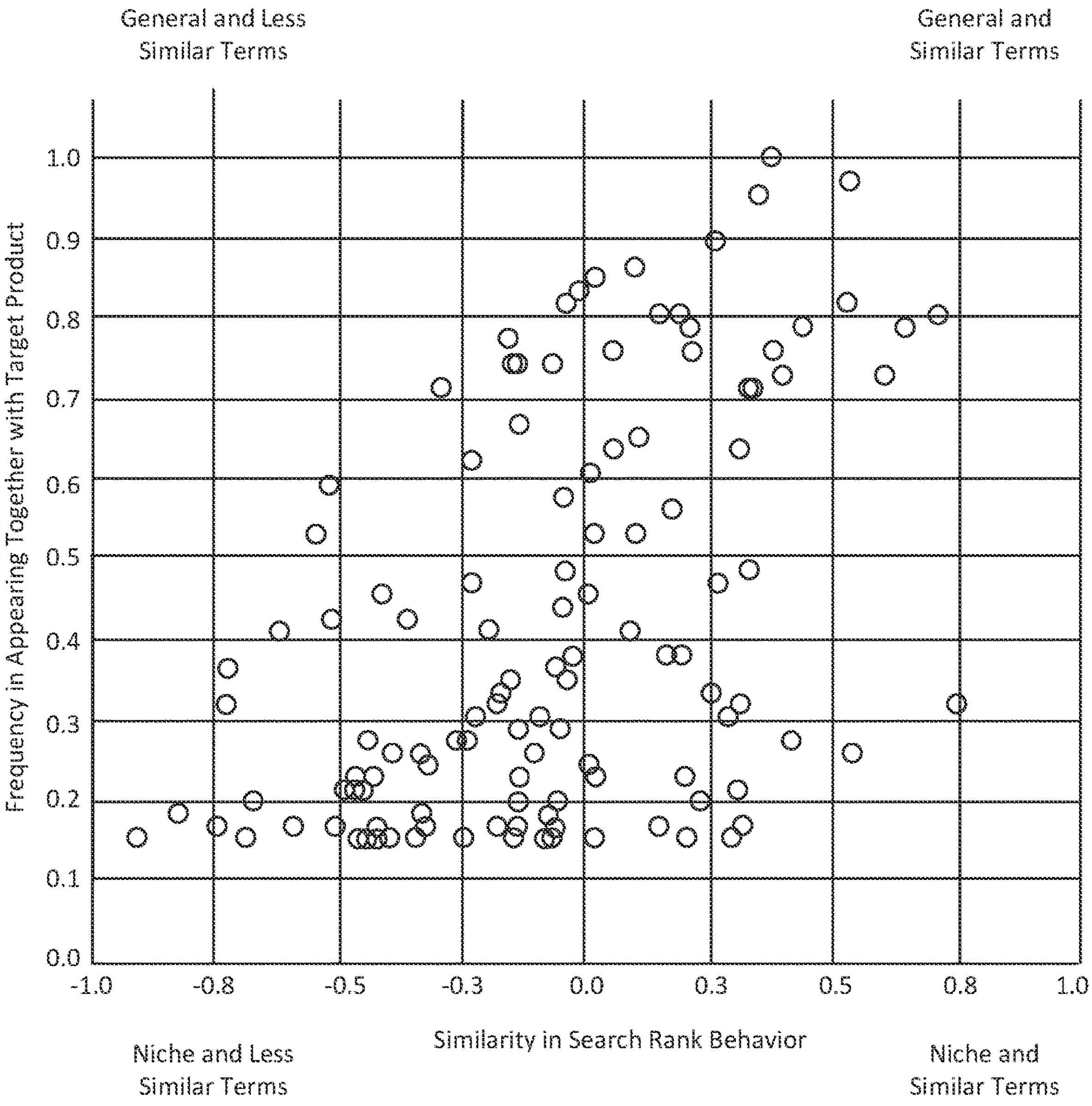
FIG. 9 is a graphic representation of a plurality of search terms plotted at points that represent a frequency and similarities in search terms associated with a target product relative to competing products.

An example representation of the graph is shown in FIG. 9. This example graph may indicate positions of each search term of a competitive product relative to the target product based on the frequency. Each point (e.g. circle) on the graph represented in FIG. 9 is representative of a search term. Each representative search term is arranged on the graph in FIG. 9 at a point that defines that terms frequency in appearing together with a search term of the target product and at a position where the search term is similar or not relative to the search terms associated with the target product. In this example graph, the further to the right any given search term is, the more similar the search terms of a competitive product are similar to the search terms of the target product. Additionally, the further to the left any given search term is, the less similar the search terms of the competitive product are similar to the search terms of the target product. Further, the closer to the top of the graph any given search term is, the more general the search term is compared to the target product while the closer to the bottom of the graph any given search term is, the more niche the search term is compared to the target product. In an embodiment, it may be most desirable to have a target product that has associated search terms relative to the search terms of a competitive product that is more general and similar. This indicates that the target product is competing with relatively well-known competing products. The processes described herein, may help to provide a report to a user indicative of how to adjust advertisement revenue to focus on more general and similar search terms as the competitive products.

In an embodiment, the machine learning module 896 may perform a forward propagation and backward propagation, using different input node values repeatedly to finely tune any matrices either weighted or not. In such a way, the machine learning module 896, in an embodiment, may adaptively learn how changes in the plurality of sets of target product search terms and rankings as well as a plurality of sets of competing product search terms and rankings may affect the data reflected in the competitive set report 898. The weight matrices associated with the layers of the neural network model in such an embodiment may describe, mathematically, these correlations for an individual target product. The neural network model (including designation of the node values in the input layer, and number of layers), along with the weight matrices associated with each layer in an embodiment may form a trained machine learning classifier, algorithm, or mathematical model to be used in generating any competitive set report 898 as described herein.

As descried herein, the output from the, now trained, machine learning module 896 is a competitive set report 898. With the competitive set report 898 the computing device 822 may, with the processor 810 and NID 880, determine a current performance on the search terms related to the target product that are most relevant to the competitive set defined in the competitive set report 898. In this process, the two variables that are discovered are how often a term appears in a search generally (e.g., a general search term volume, or how many times people search the term per day) and how often the term appears in searches associated with the competitive set report 898. More specifically, in an embodiment, those search terms found to be most general and similar among the target product and each competitive product are provided to the comparison module 834 which searches, via execution of the processor 810 at the search engine 894, those search terms defined in the competitive set report 898. During this process, the processor 810 may access the search engine 894 at the digital marketplace 882 or any other search engine and obtain search term metadata that describes the current performance of each of the search terms related to the target product that are most relevant to the competitive set defined in the competitive set report 898. The comparison module 834 may compare these most relevant search terms from the competitive set report 898 and provide that data to the user in the form of an actionable report 837. In some example, the data descriptive of the search terms related to the target product that are most relevant to the competitive set in the actionable report 837 may be provided to the user via a graphical representation.

Figure 10:
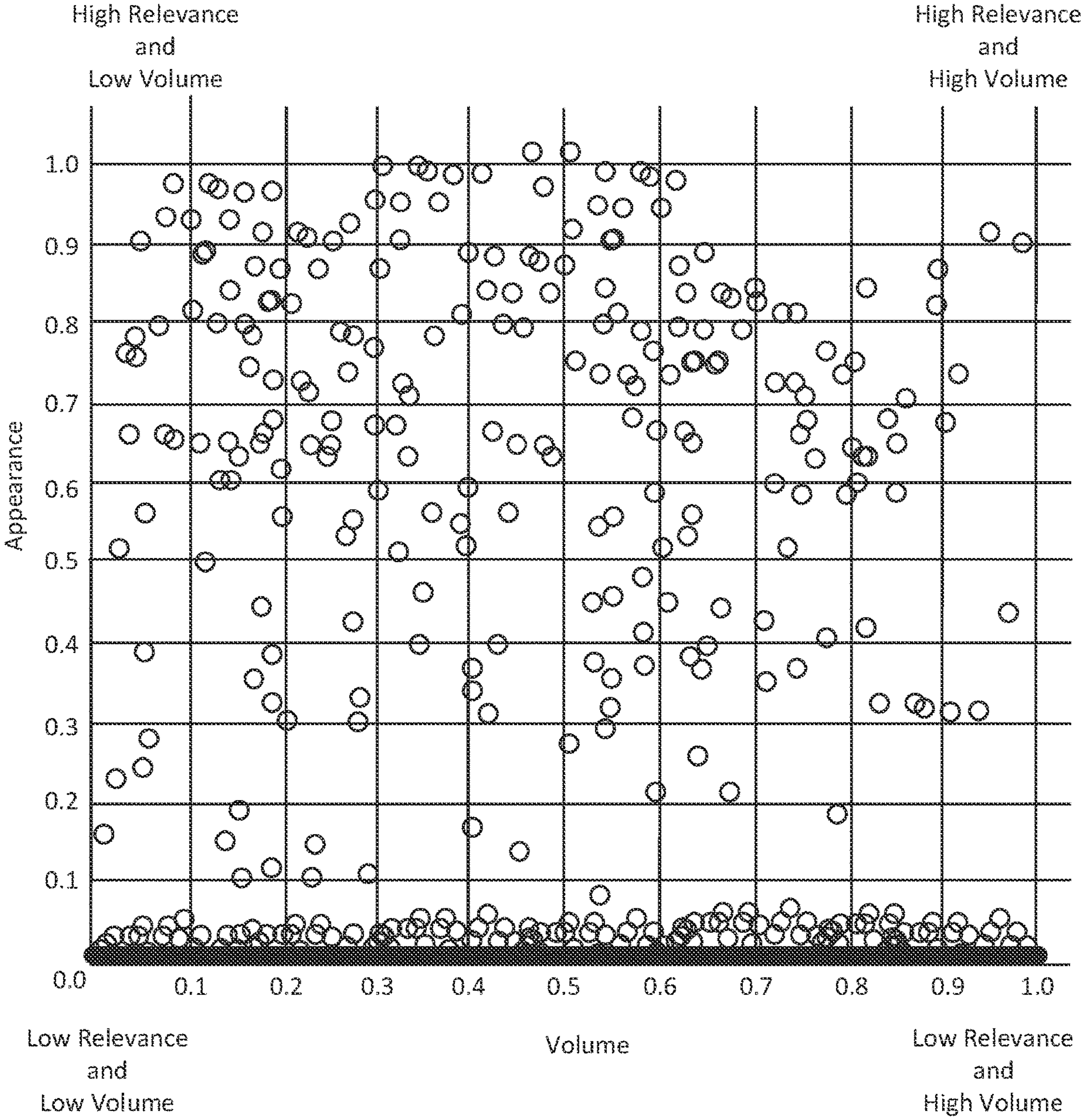
FIG. 10 is a graphic representation of a plurality of search terms plotted at points that represent relevance and volume of search terms associated with a target product relative to competing products.

An example graphical representation of this current performance on the search terms related to the target product is shown in FIG. 10. As shown in FIG. 10, the further to the right of the graph any search term (e.g., represented by a circle) is, the search term has a higher volume or appears more often than the other search terms indicating a relatively higher relevance to competing products. Additionally, the further to the left of the graph any search term is, the search term has a lower volume or appears less often than the other search terms indicating a relatively lower relevance to competing products. Also, the further to the top of the graph any search term is, the search term has a higher relevance than the other search terms indicating a relatively higher relevance to competing products. Further as the search term is placed lower on the graph, the search term has a lower relevance than the other search terms indicating a relatively lower relevance to competing products. The most frequently search and relevant terms may be provided to the comparison module 834 as well and used to further define the sustainability and feasible growth over time of the target product on, for example, the digital marketplace 882.

With those most relevant and most frequent search terms as indicated in FIG. 10 being discovered and presented in the actionable report 837, the computing device 822 may also quantify an opportunity of those search terms that, when associated with the target product, would increase the revenue and profit margins in selling the target product. In an embodiment, the processor 810 may execute a revenue module 899 to receive those relevant and most frequent search terms from the actionable report 837 and provide output to a user in the form of an increased revenue metric. The increase revenue may be calculated by the revenue module by, upon execution of the processor 810, the following formula:

$$\text{Increased Revenue}=\text{Impressions}*\text{Click Rate}*\text{Conversion Rate}*\text{Basket Size}*\text{Price} \qquad \text{Equation 1}$$

In the context of Equation 1, the impressions may be defined as the search volume of each those most relevant and most frequent search terms in an embodiment. In an embodiment, the quantity of impressions may be measured by a number of times an ad associated with the target product is presented to any given user during or after those most relevant and most frequent search terms are entered into a search engine 894. This data may be retrieved by the processor 810 by accessing a particular database or, as described herein, accessing a search query website.

In an embodiment, the click rate of Equation 1 may be defined as an estimation along a curve of the probabilities of receiving clicks associated with the rank for each of the most relevant and most frequent search terms provided by the actionable report 837. For example, a ranking may be set to include a first place click rate (e.g., 20% of clicks), second place click rate (14% of clicks), up until a 10th place click rate (6% of clicks) and beyond to any number of ranked most relevant and most frequent search terms. This data may be retrieved by the processor 810 by accessing a particular database or, as described herein, accessing a search query website.

The conversion rate in Equation 1 may, in an embodiment, be defined as percentage of those most relevant and most frequent search terms that were clicked and associated with the target product and converted into a sale (e.g., resulted in a sale of the target product). This data may be retrieved by the processor 810 by accessing a particular database or, as described herein, accessing a search query website.

In an embodiment, the basket size may be defined as the number of units purchased with each conversion. This number may be averaged over a plurality of purchases in an embodiment. For example, where a number of conversions have been detected, the processor 810 may calculate how many units of the target product were purchased at any one time (e.g., units placed in a "shopping cart" for purchase at the digital marketplace 882). This value may at least be equal to 1 or more. Again, this data may be retrieved by the processor 810 by accessing a particular database or, as described herein, accessing a search query website.

The price of the target product may be, in an embodiment, a suggested retail price by the manufacturer. In an embodiment, the quantitative value of the price in Equation 1 is an average price of the target product across any plurality of digital marketplaces 882 net of any discounts or promotions associated with those sales. This data may be retrieved by the processor 810 by accessing a particular database, accessing a search query website as described herein, or accessing sales data from a database maintained by the manufacturer of the target product.

In an embodiment, any of the impression values, click rate values, conversion rate values, basket size values, and price values in Equation 1 may be augmented by a weight value. In this embodiment, the weight value may accentuate or abate the effect of any one of these values in Equation 1 in order to better determine an increased revenue value or opportunity by the seller of the target product to increase that revenue. Because the actual, real-time data is being used in Equation 1, the seller of the target product or user of the computing device 822 may know, in real-time, whether to take advantage of any instance of increased views or sales of a product in order to increase interest in the target product over any competitors' products.

In an embodiment, the value associated with click rate in Equation 1 may significantly shift a decision by a user of the computing device 822 whether to take an action such as provide more advertising supporting the target product. This click rate associated with improving the search rank from the target product's current position on a search term to a potential rank position of a search phrase may be weighted to accommodate for an increase in importance of this value in some embodiments. For example, for a given search term that may improve an organic search rank for any of the search terms from $20^{th}$ rank to $5^{th}$ rank will improve the click rate by an estimated 3 times. Some of the improvement in rank may also originate from increased impressions and especially in situation where having an unranked target product on a search term achieves a search rank $10^{th}$ among the rankings. In this example, this would improve clicks from zero (due to zero impressions) to the associated estimated clicks of $10^{th}$ rank on that search term. As output, the processor 810 may, via the revenue module 899, provide an increased revenue report 802 describing how to, if at all, increase the revenue related to the sales of the target product.

In some instances, some search terms are not applicable to the target product but, if applicable to the target product, may increase revenue. These currently inapplicable search terms may be referred to, in the context of advertisement, as "unattainable." These unattainable search terms may be those search terms that are irrelevant, at least initially, to the target product for some reason or not yet associated with the target product because platform data associated with the digital marketplace 882 lacks data associated with the target product. In an embodiment, the machine learning module 896 may also be trained and used to receive data related to the characteristics of the target product, current competitors of the target product, and the current state of the ecommerce search term algorithm to determine the "winnability" of a search term. The winnability of a search term may be defined as the probability of winning each search term (e.g., having the target product associated with the search term) at any given point in time along with the estimated costs to win those search terms.

The machine learning module 896 may be trained with winnability inputs as described herein in order to provide a winnability report 804. Some of the inputs for this model included any number of inputs and the description of certain types of inputs is not meant to limit the breadth of input into the machine learning module 896 in order to obtain a winnability report and the present specification contemplates these additional and different inputs. By way of example, an input may include a current and historical price for both the target product and competitive products. This historical pricing may be retrieved from one or more digital marketplaces 882 via the execution of the processor 810 and NID 880 as described herein. In this specific example, the processor 810 may cause the NID 880 to access the one or more digital marketplaces 882 either via a wired (wired transmitter/receiver 840) or wireless (wireless transmitter/receiver 850) connection, find instances of the target product and competing products being sold, and retrieve their historic pricing values.

Another input to the machine learning module 896 may include a current and historical review ratings and review counts associated with the target product and competing products. These review ratings and review counts data may be retrieved from one or more digital marketplaces 882 via the execution of the processor 810 and NID 880 as described herein. Digital marketplaces 882 often provide a GUI that allows the consumer of the target product and competing products to enter text descriptive of the consumers' experiences with the target product and competing products as well as a ranked evaluation of those products in the form of a number rating system or start rating system. In this specific example, the processor 810 may cause the NID 880 to access the one or more digital marketplaces 882 either via a wired or wireless connection and find review ratings and review counts associated with the target product and competing products being sold, and provide that review ratings and review counts data to the machine learning module 896.

Yet another input to the machine learning module 896 may include content similarity scores of any a search term related to the target product and competing products. These scores may be generated based on the data provided, in an embodiment, in FIG. 9. For example, the further to the right any given search term is on the graph of FIG. 9, the more similar the search terms of a competitive product are similar to the search terms of the target product. In a specific example, the x-axis (bottom) of the graph of FIG. 9, or its associated data, may be used to assign this similarity score. As is shown in FIG. 9, the similarity score may be either a positive or a negative score per the number ranking on the x-axis of FIG. 9. In this example, the similarity score may be a positive weight or a negative weight reflected in the winnability report 804 provided by the processor 810 upon execution of the machine learning module 896. In this embodiment, the processor 810 may, again, cause the NID 880 to access the one or more digital marketplaces 882 either via a wired or wireless connection and retrieve the plurality of sets of target product search terms and rankings as well as a plurality of sets of competing product search terms and rankings associated with the target product and competing products being sold. This data is then provided to the machine learning module 896.

Still further, other input to the machine learning module 896 may include platform specific information such as average best seller rank (BSR) for any given digital marketplaces 882 associated with the target product and any number of competing products. A BSR may vary at any given digital marketplace 882, but these rankings may be averaged over a plurality of digital marketplaces 882 to get this value. In this embodiment, the processor 810 may, again, cause the NID 880 to access the one or more digital marketplaces 882 either via a wired or wireless connection and retrieve this BSR data. This data is then provided to the machine learning module 896.

Other input to the machine learning module 896 may include a projected search term volume and click distribution. In connection with this type of data provided to the machine learning module 896, the projected search term volume may be retrieved from the data used to create the graph in FIG. 10. This data describing how often any given search term associate with the target product and competing product appears in searches may be accessed by the processor 810 and provided as input to the machine learning module 896. Additionally, any click distribution describing how many clicks any given search term gets may be accessed by the processor 810 and NID 880 at the search engine 894 of the digital marketplaces 882.

Yet other input to the machine learning module 896 may include historical variations in search term ranks related to the target product and search phrase products. At any given time, a search engine 894 may have varying fluctuations in what is searched for on the internet. These search terms may be ranked and their historic ranking may change over time based on a number of social, political, environmental, and economic factors. This historical data may be retrieved from the search engine 894 by the processor 810 and NID 880 and provided to the machine learning module 896.

Another example input to the machine learning module 896 may include targeted advertising spending associated with the search terms associated with the target product. This data may be maintained on any database that is accessible to the processor 810 of the computing device 822. In a specific embodiment, this data descriptive of the targeted advertising spending associated with the search terms associated with the target product may be maintained by the seller of the targeted product on a private database and the user of the computing device 822 may be given secure access to that database. This type of data too may be provided to the machine learning module 896.

With all of these different types of data obtained by the processor 810 via the NID 880, the machine learning module 896 may build a number of mathematical models that provide a winnability report 804 that describes a probability of winning each search term (e.g., having the target product associated with the search term) at any given point in time along with the estimated costs to win those search terms. As with each machine learning module 896, the machine learning module 896 may be "taught" by using the winnability factors described herein. In a specific embodiment, the machine learning module 896 may implement a non-parametric and parametric learning technique. For example, the machine learning module in an embodiment may model the relationships between each plurality of sets of winnability factors using a layered neural network topology. Such a neural network in an embodiment may include an input layer (e.g., the winnability factors) including a known, recorded set of values for each of these parameters, settings, indicators, and usage data metrics, and an output layer including a projected winnability report 804, based on the known, recorded set of values in the input layer. The machine learning module 896 in an embodiment may propagate input through the layers of the neural network to project or predict an optimal winnabilities of search terms based on the known and recorded search term metrics, and compare these projected values to optimal search terms to be presented in the winnability report 804. Using a back-propagation method, the machine learning module 896, in an embodiment, may then use the difference between the projected values and the known optimal values to adjust weight matrices of the neural network describing the ways in which changes in each of the search term data metrics are likely to affect the optimal search terms to be presented in the winnability report 804.

With the output layer, the computing device 822 may provide learned competitive search terms that are determined to be the optimal search terms if any have been designated and based upon the winnable search terms detected at the search engine 894 of the digital marketplace 882 or other database during use of the computing device 822. These resulting learned optimal search terms may be suggested to a user or automatically implemented. Suggestion may come with an indicator and may be shown in a graph at a user interface for, in an embodiment, approval by the user before implementation of the other processes executed by the processor 810 of the computing device 822.

In an embodiment, the machine learning module 896 may perform a forward propagation and backward propagation, using different input node values repeatedly to finely tune any matrices either weighted or not. In such a way, the machine learning module 896, in an embodiment, may adaptively learn how changes in the winnability factors may affect the data reflected in the winnability report 804. The weight matrices associated with the layers of the neural network model in such an embodiment may describe, mathematically, these correlations for an individual target product. The neural network model (including designation of the node values in the input layer, and number of layers), along with the weight matrices associated with each layer in an embodiment may form a trained machine learning classifier, algorithm, or mathematical model to be used in generating any winnability report 804 as described herein.

As descried herein, the output from the, now trained, machine learning module 896 is a winnability report 804. With the winnability report 804 the computing device 822 may, with the processor 810 and NID 880, determine a probability of attaining the desired change in revenue based on a required investment. In an embodiment, the required investment may be calculated by the following equation:

$$\text{Required Investment}=\text{Projected Bid}^*(\text{Impressions}^*\text{Clickthrough Rate}) \qquad \text{Equation 2}$$

A return on investment (ROI) may then be calculated using the following equation:

$$ROI = \text{Increased Revenue} * \left(\frac{\text{Projected Time to Remain at Rank}}{\text{Required Investment}}\right) \qquad \text{Equation 3}$$

With Equations 2 and 3 those target products with search terms with high returns on investment can then be prioritized for both advertising and search engine optimization actions by the user. In this manner, the computing device 822 may execute the machine learning module 896 for a second purpose of determine the "winnability" of a search term where additional funds are applied to advertisements and search engine optimization.

In an embodiment, the ad spend margin, ad spend potential and revenue potential calculations by the processor 810 may also be conducted to specifically determine how much additional advertising funds to apply to the target product. Again, the ad spend margin may be calculated by multiplying a target ACoS by the price of the target product. A target ACoS may be determined and set by the seller based on available capitol or may be set by the seller based on the fraction of the revenue received thus far from the sale of the target product on the digital marketplace 382 and costs of manufacturing. Ad spend potential may then be calculated by multiplying monthly opportunity units (OU) by the spend margin. The monthly OUs may be calculated as a result of the conversion rate of clicks to the target product that is the results of sales of the target product after a purchaser has viewed the product. The revenue potential may then be calculated by multiplying the OU with the price of the target product. This revenue potential of each of the target products may be ranked to determine the placement of the target product within the digital marketplace 882. The search terms presented in the winnability report 804 may be sorted by revenue potential to determine the target product's best opportunities for revenue growth. In order to refine a recommendation, the process may continue with inputting estimated bid amounts from the digital marketplaces 882 required to win advertising slots for these keywords. In this manner, the execution of the processor 810 may initiate these calculations in order to predict a number of clicks and a cost necessary to achieve the potential growth. The equation to make this calculation is found in connection with Equation 2 herein.

An ROI may further be calculated by the following equation:

$$\text{ROI}=\text{Ad Spend Potential}^*(\text{Investment Payoff Term}-\text{Investment Needed}) \qquad \text{Equation 4}$$

As highly winnable terms are targeted in this process with both advertising and search engine optimization techniques, increasing the associated impressions, clicks, and conversions, the processing applied to the target product may continually adapt. As a target product succeeds on new search terms the competitive products set defined in the competitive set report 898 will shift to be compared to larger and less niche competing products. As the competitive products set defined in the competitive set report 898 shifts, the competitive terms set will shift as well. As reviews, terms, seller ranks, and other attributes shift, the winnability and associated required investment of each term also shifts. With the shift in winnability, new terms are prioritized and the cycle continues iteratively to cause the revenue associated with the targeted product to increase proportionally.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 Para. 6. It will be apparent to those having skill in the art that changes may be made to the details of the above-described embodiments without departing from the underlying principles of the invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method of evaluating a product, the method comprising:

with an assessment module executed by a processor:
  assessing attributes of a target product; and
  listing relevant descriptive terms of the target product descriptive of the attributes of the target product;
with a network interface device, accessing a computer-networked marketplace and identifying at least one organic competing product matching at least one descriptive term;
with a comparison module executed by the processor:
  comparing the descriptive terms of the target product to descriptive terms associated with the at least one organic competing product to generate a competitivity score; and
with a recommendation module executed by the processor:
  in response to the competitivity score not satisfying a threshold competitivity score, identifying the target product as non-competitive;
  generating an actionable report descriptive of a projected performance of the target product in the computer-networked marketplace relative to the at least one organic competing product, in response to the competitivity score satisfying the threshold competitivity score;
  generating a winnability report descriptive of:
    a probability of winning a winnable search term associated with the target product; and
    an estimated cost to win the winnable search term;
  executing, via the processor, a machine learning model to develop the winnability report, wherein the machine learning model is initially trained using winnability inputs, and wherein the machine learning model models relationships between each two or more winnability factors using a layered neural network topology to predict at least one optimal winnability search term;
  fine-tuning, by the processor, the machine learning model using back-propagation that uses a difference between the predicted at least one optimal winnability search term and a known optimal winnability search term to adjust weight matrices of the machine learning model; and
  executing, via the processor, the machine learning model to augment the actionable report using the winnable search term.

2. The method of claim 1, further comprising determining attributes of the target product, the attributes associated with:

ratings provided by at least one purchaser of the target product;
a number of reviews associated the target product;
listed prices of the target product;
content within the reviews provided by the at least one purchaser of the target product; and
ranking of the target product relative to the at least one organic competing product.

3. The method of claim 1, further comprising causing a text analytics module to parse text associated with the target product to be used as the descriptive terms target product used to identify the at least one organic competing product.

4. The method of claim 1, further comprising causing a competitive score generating module to determine whether the competitivity score has reached the threshold competitivity score and, in response to the threshold competitivity score being met or exceeded, forward the competitivity score onto a recommendation module to generate the actionable report.

5. The method of claim 4, further comprising passing the competitivity score and revenue data associated with the at least one organic competing product onto the recommendation module to generate the actionable report descriptive of a projected performance of the target product.

6. The method of claim 4, in response to the competitive score generating module determining that the competitivity score does not meet the threshold competitivity score, the competitive score generating module passes a threshold failure signal to the recommendation module indicative of the non-competitive status of the target product.

7. A method of providing a competitive assessment of a target product on a marketplace, comprising:

with a processor, evaluating the target product to determine attributes of the target product;
with the processor accessing a digital marketplace to determine at least one organic competing product comparative to the target product;
upon execution of a competitivity score generator by the processor, calculating, with the processor, a competitivity score related to the ability of the target product to compete with the at least one organic competing product;
in response to the competitivity score not satisfying a threshold competitivity score, identifying, with the processor, the target product as non-competitive;
upon execution of a recommendation module, generating, with the processor, an actionable report based on the ability of the target product to compete with the at least one organic competing product, in response to the competitivity score satisfying the threshold competitivity score;
generating, with the processor, a winnability report descriptive of:
  a probability of winning a winnable search term associated with the target product; and
  an estimated cost to win the winnable search term;
executing, with the processor, a machine learning model to develop the winnability report, wherein the machine learning model is initially trained using winnability inputs, and wherein the machine learning model models relationships between each two or more winnability factors using a layered neural network topology to predict at least one optimal winnability search term;
fine-tuning, with the processor, the machine learning model using back-propagation that uses a difference between the predicted at least one optimal winnability search term and a known optimal winnability search term to adjust weight matrices of the machine learning model; and executing, with the processor, the machine learning model to augment the actionable report using the winnable search term.

8. The method of claim 7, further comprising determining, with the processor, attributes of the target product, the attributes associated with:

ratings provided by at least one purchaser of the target product;

reviews provided by the at least one purchaser of the target product;

listed prices of the target product;

content within the reviews provided by the at least one purchaser of the target product; and ranking of the target product relative to the at least one organic competing product.

9. The method of claim 7, further comprising parsing, with the processor, text associated with the target product to be used as the attributes of the target product used to identify the at least one organic competing product.

10. The method of claim 7, further comprising determining, with the processor, whether the competitivity score has reached a threshold and, in response to the threshold being met or exceeded, forward the competitivity score onto a report module.

11. The method of claim 10, further comprising using, with the processor, the competitivity score and revenue data associated with the at least one organic competing product to generate an actionable report descriptive of a projected performance of the target product.

12. The method of claim 10, further comprising, with the processor:

augmenting the actionable report with data descriptive of:

search terms found to be most general and similar between the target product and organic competing product; and most relevant and frequent search terms similar between the target product and organic competing product.

13. The method of claim 12, further comprising executing, with the processor, the machine learning model to develop the augmented actionable report.

14. A computer program product for evaluating a product, the computer program product comprising:

a non-transitory storage medium; and computer program code, encoded on the non-transitory storage medium, wherein the computer program code is configured to cause at least one processor to perform the steps of:

causing an assessment module to:

assess attributes of a target product;

list descriptive terms for the target product descriptive of the attributes of the target product;

via a network interface device, accessing a computer-networked marketplace and identifying at least one organic competing product;

comparing the attributes of the target product to the attributes of the at least one organic competing product to generate a competitivity score;

in response to the competitivity score not satisfying a threshold competitivity score, identifying the target product as non-competitive;

determine an opportunity for the target product in the marketplace, in response to a competitivity score satisfying the threshold competitivity score;

generate a winnability report descriptive of:

a probability of winning a winnable search term associated with the target product; and an estimated cost to win the winnable search term;

execute a machine learning model to develop the winnability report, wherein the machine learning model is initially trained using winnability inputs, and wherein the machine learning model models relationships between each two or more winnability factors using a layered neural network topology to predict at least one optimal winnability search term;

fine-tune the machine learning model using back-propagation that uses a difference between the predicted at least one optimal winnability search term and a known optimal winnability search term to adjust weight matrices of the machine learning model; and execute the machine learning model to augment the actionable report using the winnable search term.

15. The computer program product of claim 14, further comprising computer program code is configured to cause at least one processor to read an identification tag associated with the target product while assessing the attributes of the target product to determine:

ratings provided by at least one purchaser of the target product;

reviews provided by the at least one purchaser of the target product;

listed prices of the target product;

content within the reviews provided by the at least one purchaser of the target product; and ranking of the target product relative to the at least one organic competing product.

16. The computer program product of claim 14, further comprising computer program code to, upon execution of the processor, cause a description module to generate, based on the attributes of the target product, descriptive terms that include keywords contemplated to be terms that are used to search for the at least one organic competing product at a digital marketplace.

17. The computer program product of claim 14, further comprising computer program code to, upon execution of the processor, cause a competitive score generating module to generate the competitivity score descriptive of the competitivity of the target product relative to the least one organic competing product.

18. The computer program product of claim 17, further comprising computer program code to, upon execution of the processor, with a filtering module, filter the descriptive terms to relevant descriptive terms that have resulted in a purchase of the target product in the marketplace.

* * * * *